US012781888B2

(12) United States Patent
Kennedy

(10) Patent No.: US 12,781,888 B2
(45) Date of Patent: Nov. 3, 2026

(54) MECHANICAL JOINT RETAINER GLAND

(71) Applicant: MCWANE, INC., Birmingham, AL (US)

(72) Inventor: Paul Kennedy, Horseheads, NY (US)

(73) Assignee: MCWANE, INC., Birmingham, AL (US)

( * ) Notice: Subject to any disclaimer, the term of this patent is extended or adjusted under 35 U.S.C. 154(b) by 0 days.

(21) Appl. No.: 19/087,406

(22) Filed: Mar. 21, 2025

(65) Prior Publication Data

US 2025/0216009 A1 Jul. 3, 2025

Related U.S. Application Data

(63) Continuation of application No. 18/777,078, filed on Jul. 18, 2024.

(60) Provisional application No. 63/527,494, filed on Jul. 18, 2023.

(51) Int. Cl.
*F16L 21/08* (2006.01)
*F16L 21/04* (2006.01)

(52) U.S. Cl.
CPC ............... *F16L 21/08* (2013.01); *F16L 21/04* (2013.01)

(58) Field of Classification Search
CPC ......... F16L 21/08; F16L 21/007; F16L 21/03; F16L 21/04; F16L 23/028; F16L 23/032; F16L 23/0283; F16L 23/0286; F16L 37/122; F16L 37/123; F16L 37/16; F16L 47/06; F16L 47/08; F16L 19/06; F16L 19/045; F16L 19/08; F16L 19/0283
See application file for complete search history.

(56) References Cited

U.S. PATENT DOCUMENTS

| | | | | |
|---|---|---|---|---|
| 1,887,877 A * | 11/1932 | Shaffer | F16L 33/222 | 285/259 |
| 4,070,046 A * | 1/1978 | Felker | F16L 21/022 | 285/348 |
| 4,896,903 A | 1/1990 | Shumard | | |
| 6,106,029 A * | 8/2000 | DeMore | F16L 21/04 | 285/104 |
| 12,297,937 B2 * | 5/2025 | Kennedy | F16L 21/08 | |

FOREIGN PATENT DOCUMENTS

| | | |
|---|---|---|
| CA | 2189808 A1 | 5/1997 |
| GB | 2307018 A | 5/1997 |

* cited by examiner

*Primary Examiner* — Aaron M Dunwoody
(74) *Attorney, Agent, or Firm* — Brown & Michaels, PC

(57) ABSTRACT

A retainer gland to secure the connection and seal of a pipe joint includes an outer securement ring and an inner gripper ring. The outer securement ring has a periphery and a plurality of fastener flanges in spaced relation about the periphery, each of the fastener flanges having a mounting hole therethrough. The inner gripper ring is configured to be disposed within the outer securement ring. The inner gripper ring has a base and a plurality of gripper fingers disposed circumferentially about the base and extending from the base.

14 Claims, 20 Drawing Sheets

MECHANICAL JOINT RETAINER GLAND

REFERENCE TO RELATED APPLICATIONS

This application is a continuation of co-pending application Ser. No. 18/777,078, filed Jul. 18, 2024, entitled "Mechanical Joint Retainer Gland". The aforementioned application is hereby incorporated herein by reference.

This application claims one or more inventions disclosed in Provisional Application No. 63/527,494, filed Jul. 18, 2023, entitled "Retainer Gland". The benefit under 35 USC § 119 (e) of the United States provisional application is hereby claimed, and the aforementioned application is hereby incorporated herein by reference.

BACKGROUND

This application is directed generally to the field of mechanical joints, and more specifically to a novel retainer gland used in pipe joints, including but not limited to PVC, HDPE, and ductile iron pipe joints.

A variety of joints are available for ductile iron pipe and fittings, such as for use underground or in other applications. Some examples include push-on joints, which can include a rubber gasket placed in a groove inside a socket at a bell end of a pipe. After lubricating the joint in accordance with manufacturer's instructions, a beveled end of the pipe is advanced or pushed past the gasket, thereby compressing the gasket and forming a suitable pressure-tight and dependable seal. Some push-on joints include a gasket recess that is cast integrally into the bell of the pipe.

Other examples of joints available for ductile iron pipe and fittings include mechanical joints, which differ from push-on joints. The dimensions of mechanical joints can be standardized as specified in ANSI/AWWA C111/A21.11 "Rubber-Gasket Joints for Ductile Iron Pressure Pipe and Fittings". These joints are typically available for 3-inch to 24-inch diameter ductile iron pipe manufactured in accordance with ANSI/AWWA C151/A21.51 and 3-inch to 48-inch fittings manufactured in accordance with ANSI/AWWA C110/A21.10 and C153/A21.53. Mechanical joints use the basic principles of the stuffing box and a gland developed over 100 years ago to prevent leakage of fluid, such as water or steam, between turning parts of machine elements.

More specifically, known mechanical pipe joints generally include four parts: namely, a bell of a pipe or pipe fitting with an internally cast flange; a rubber gasket that fits in a socket of the bell; a gland or follower ring configured to compress the rubber gasket; and T-bolts and nuts necessary for tightening the pipe joint. Retainer glands are known in the field of mechanical pipe joints for securing the pipe joints.

A known retainer gland 10 is shown in FIG. 1, which is defined by an annular ring-shaped body 16 usually made from cast iron. The body 16 has an outer periphery 24 that includes a plurality of fastener flanges 20 in spaced relation about the circumference and projecting radially outward from the periphery 24, each of the fastener flanges 20 having a mounting hole 28 therethrough for receiving a T-bolt and corresponding tightening nut (not shown), which are used tighten the retainer gland 10 to the bell and compress the rubber gasket between the bell and the pipe. A plurality of engagement member flanges 30 also project from the periphery 24 generally or approximately transverse to the fastener flanges 20. The engagement member flanges 30 accommodate a corresponding number of radial engagement members

34 that are used to transversely engage and retain the pipe axially. Another similar example of a known retainer ring is described in U.S. Pat. No. 4,896,903.

FIG. 2 illustrates an unassembled view of a known pipe joint assembly 40 that includes a pipe 42, which according to this example is a section of PVC pipe having a rubber gasket 44 disposed about the outer periphery at one end of the pipe 42. The rubber gasket 44 is defined by an outer annular rim that downwardly extends to an outer inwardly beveled surface 46. A pipe socket 48 is further provided, the pipe socket 48 having an annular interior beveled surface 50 that accommodates the outer inwardly beveled surface 46 of the rubber gasket 44, as well as an integrated outer ring flange 52. The outer ring flange 52 has a plurality of fastener flanges 54 that are formed on an outer periphery 56, each of the fastener flanges 54 having a through mounting hole 58 sized and configured to receive a T-bolt 60 and a corresponding tightening nut 62. In this example, the pipe socket 48 is presented as a closed end cap, but the pipe socket 48 can be typically defined by a through opening.

As shown in FIG. 3, one end of the pipe 42 is seated within the pipe socket 48 initially, the rubber gasket 44 being accommodated therein such that the outer annular rim is seated in the socket with the outer beveled surface 46 (see FIG. 2) of the rubber gasket 44 directly engaging the interior beveled surface 50 (se FIG. 2) of the pipe socket 48. An inner periphery of the rubber gasket 44 is supported by the pipe 42, and an outer periphery and bottom of the rubber gasket 44 is supported by the pipe socket 48.

As shown in FIG. 4, the retainer gland 10 is fitted over the pipe 42 with the fastener flanges 20 of the retainer gland 10 being aligned with the fastener flanges 54 of the outer ring flange 52 of the pipe socket 48. The pipe joint/fitting is then sealed by the combination of T-bolts 60 (see FIG. 2) and nuts 62 (see FIG. 2) being secured through the aligned mounting holes 58 of the pipe socket 48 and mounting holes 32 of the retainer gland 10, respectively, and also by tightening of the radial engagement members 34 through the engagement member flanges 30 of the retainer gland 10 in combination.

The radial engagement members 34 must be actuated to move gripper elements 36 radially inward against and compress against or bite into the pipe 42, to retain the pipe from slipping or moving axially with respect to the retainer gland 10, and hence the bell when the retainer gland 10 is tightened to the bell using the fastener flanges 20, the T-bolts 60, and the corresponding tightening nuts 62. Accordingly, these radial engagement members 34 require additional work beyond the tightening of the T-bolts 60 and nuts 62 to tighten the retainer gland 10 to the pipe socket 48 and compress the rubber gasket between the pipe socket 48 and the pipe 42. Often mechanical joints are buried, installed or replaced underground, where access around the mechanical joint is limited and it can be difficult to find space necessary to actuate the radial engagement members 34 in addition to the axially oriented T-bolts 60. Actuating the radial engagement members 34 requires a significant amount of additional excavation.

To minimize this extra work, the retainer gland 10 is equipped with a minimal number of the radial engagement members 34, equally spaced circumferentially to facilitate equal force of the radial engagement members 34 on the pipe 42. FIGS. 1-4 show three radial engagement members 34, which is a typical number, and which is a number that leaves significantly more space around the circumference of the pipe 42 bare than engaged by a radial engagement member 34. Accordingly, the force of the radial engagement members 34 against the pipe 42 is non-uniform around the circumference, and this non-uniform force can lead to pipe deformation.

SUMMARY

A retainer gland for use in pipe joints and the like facilitates the secured connection and seal of a mechanical joint, but in a simpler manner than well established and prior apparatuses used for these purposes and with more uniform radial pressure on the pipe. Additionally, the herein described retainer gland can be fabricated in accordance with a number of different forming processes.

According to an embodiment, a retainer gland for securing a pipe joint includes an outer securement ring and an inner gripper ring. The outer securement ring has a periphery and a plurality of fastener flanges in spaced relation about the periphery. Each of the fastener flanges has a mounting hole therethrough. The inner gripper ring is configured to be disposed within the outer securement ring. The inner gripper ring has a base and a plurality of gripper fingers disposed circumferentially about the base and extending from the base.

These and other features and advantages will be readily apparent from the following Detailed Description, which should be read in conjunction with the accompanying drawings.

BRIEF DESCRIPTION OF THE DRAWINGS

Some of the embodiments will be described in detail, with reference to the following figures, wherein like designations denote like members, as follows.

DETAILED DESCRIPTION

Figure 1:
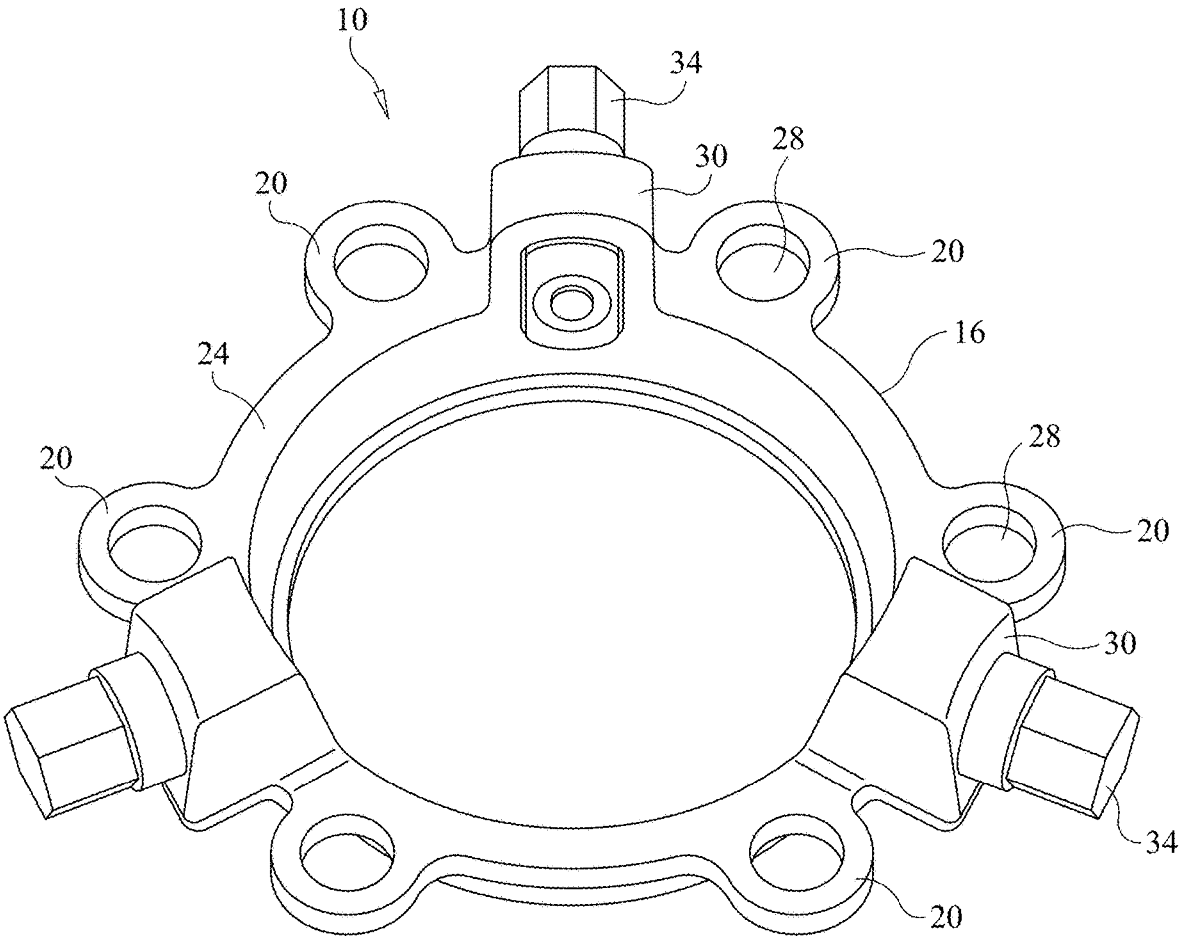
Fig. 1 Prior Art
FIG. 1 is a top perspective view of a prior art retainer gland.

The following details one or more exemplary embodiments of a retainer gland made in accordance with aspects of the present invention for use in pipe joints, such as but not limited to PVC pipe, HDPE PIPE, and ductile iron pipe joints and/or related applications.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Notwithstanding that the numerical ranges and parameters setting forth the broad scope of embodiments are approximations, the numerical values set forth in the specific examples are reported as precisely as possible. Any numerical value, however, inherently contains an error tolerance necessarily resulting from the standard deviation found in its testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The terms "approximately" and "about", when qualifying a quantity, shall mean the quantity with a tolerance plus or minus 10 percent of the quantity, unless otherwise specified.

With reference to FIGS. 5-12, there is shown a retainer gland 100, which is made in accordance with an exemplary embodiment of the present invention. The retainer gland 100 is defined by two (2) major components; namely, an outer securement ring 120 and an inner gripper ring 160. The inner gripper ring 160 can be secured within an inner periphery 126 of the outer securement ring 120. The retainer gland 100 can be made entirely from a ductile iron, although other suitable structural materials can be utilized. In addition, the retainer gland 100 can be formed in accordance with various manufacturing processes, including but not limited to sand casting, plaster mold casting, investment casting, lost-wax casting, lost-foam casting, fill-mold casting, evaporative pattern casting, shell casting, and precision machining.

Figure 2:
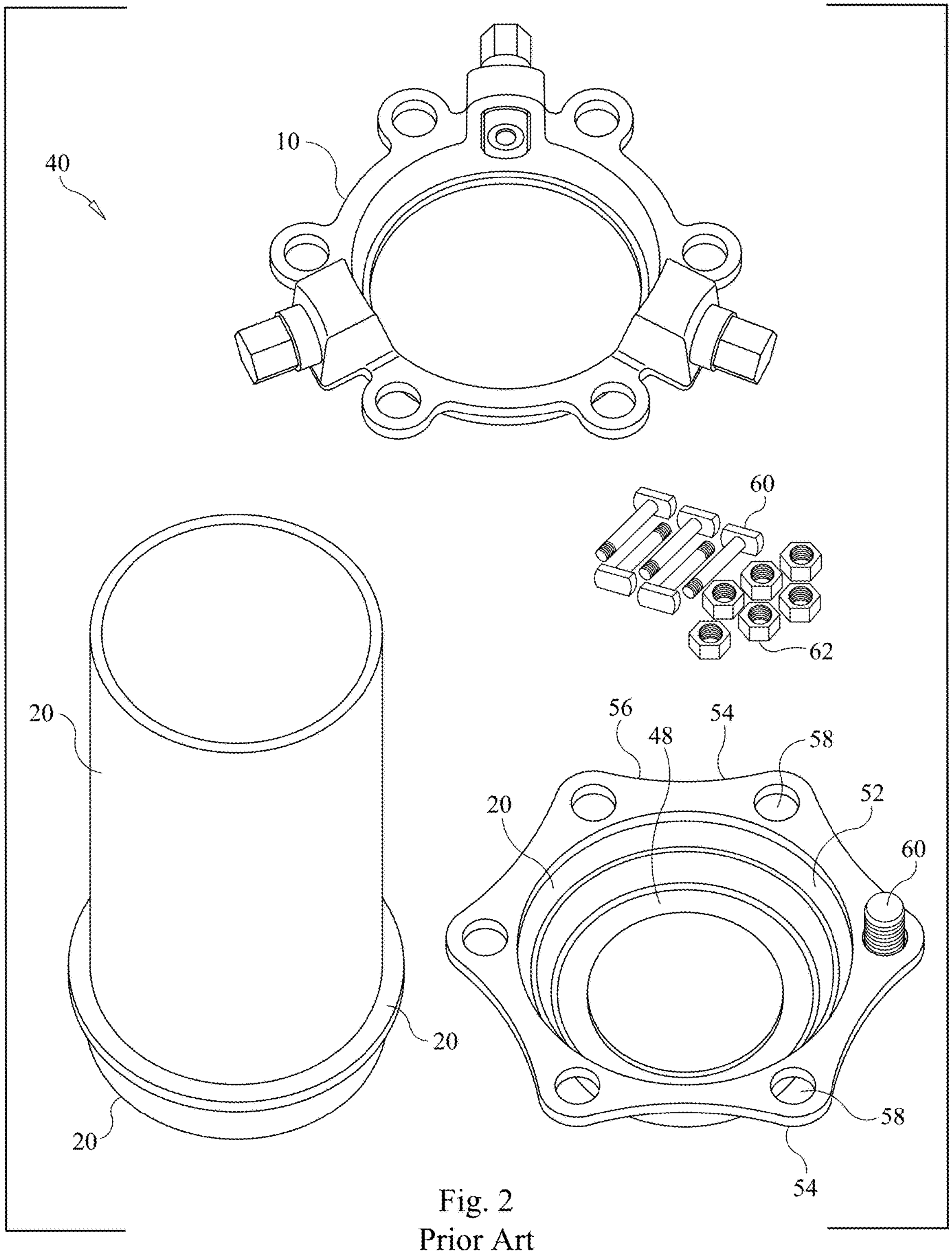
Fig. 2 Prior Art
FIG. 2 is a perspective view of an unassembled prior art pipe joint assembly including the prior art retainer gland of FIG. 1.
Figure 6:
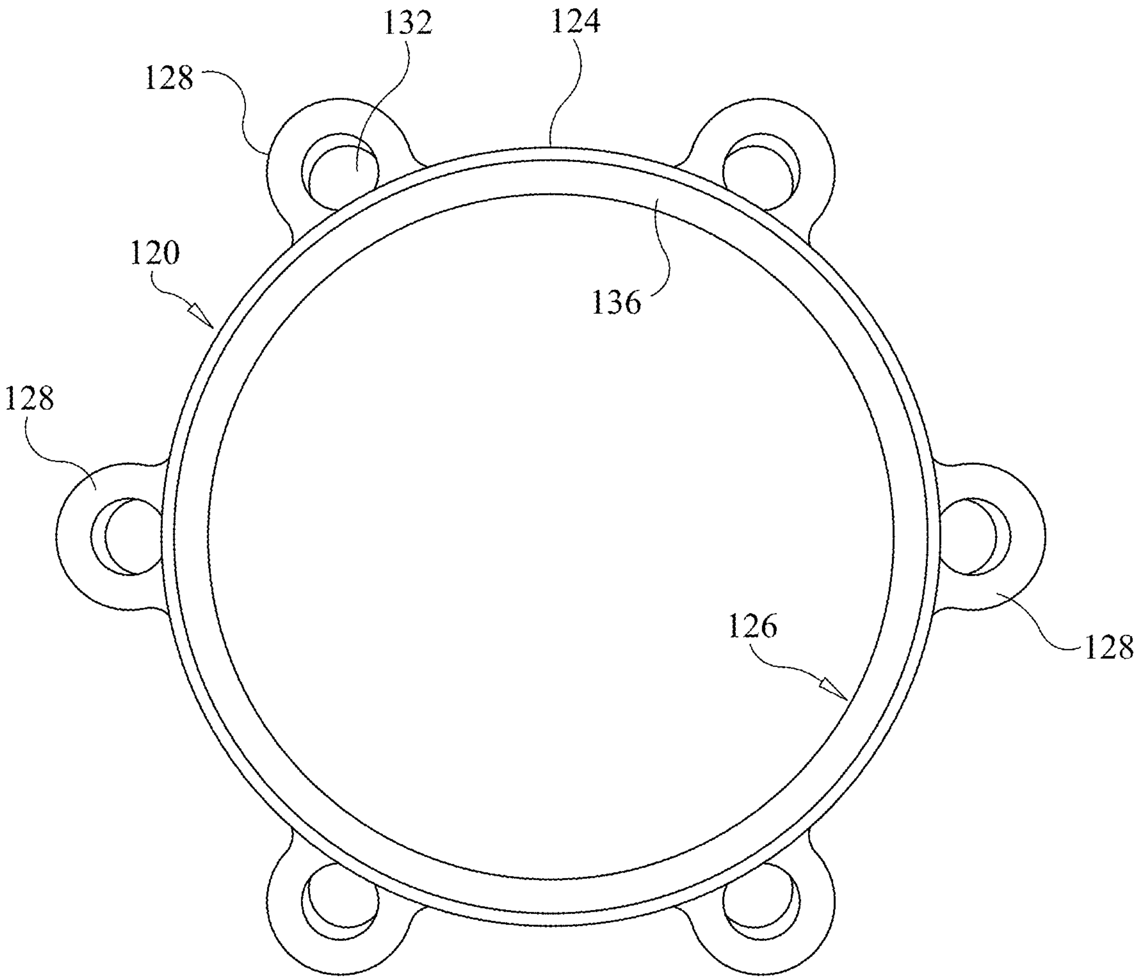
FIG. 6 is a top plan view of the outer securement ring of the retainer gland of FIG. 5.
Figure 7:
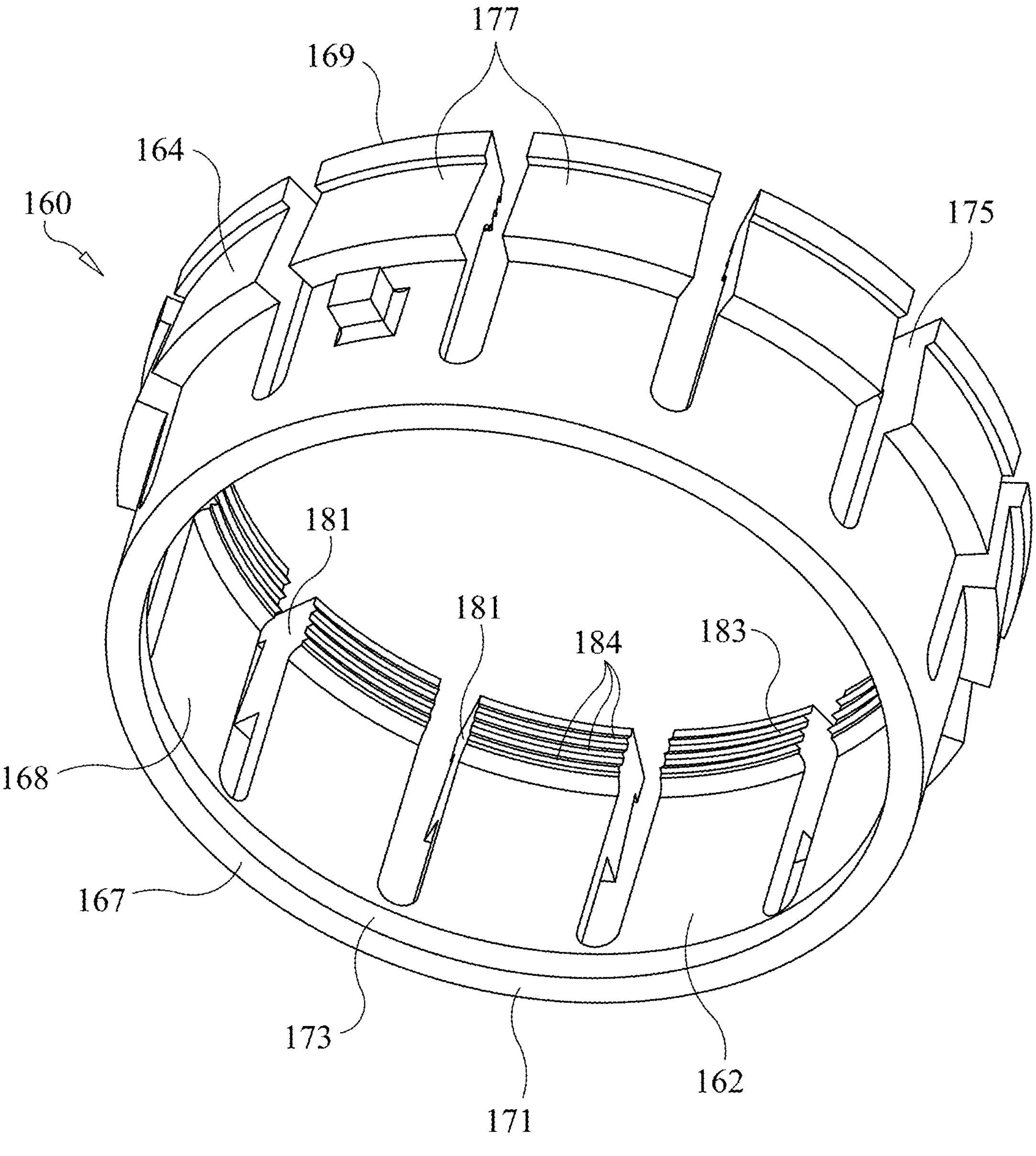
FIG. 7 is a perspective view of the inner gripper ring of the retainer gland of FIG. 5.
Figure 8:
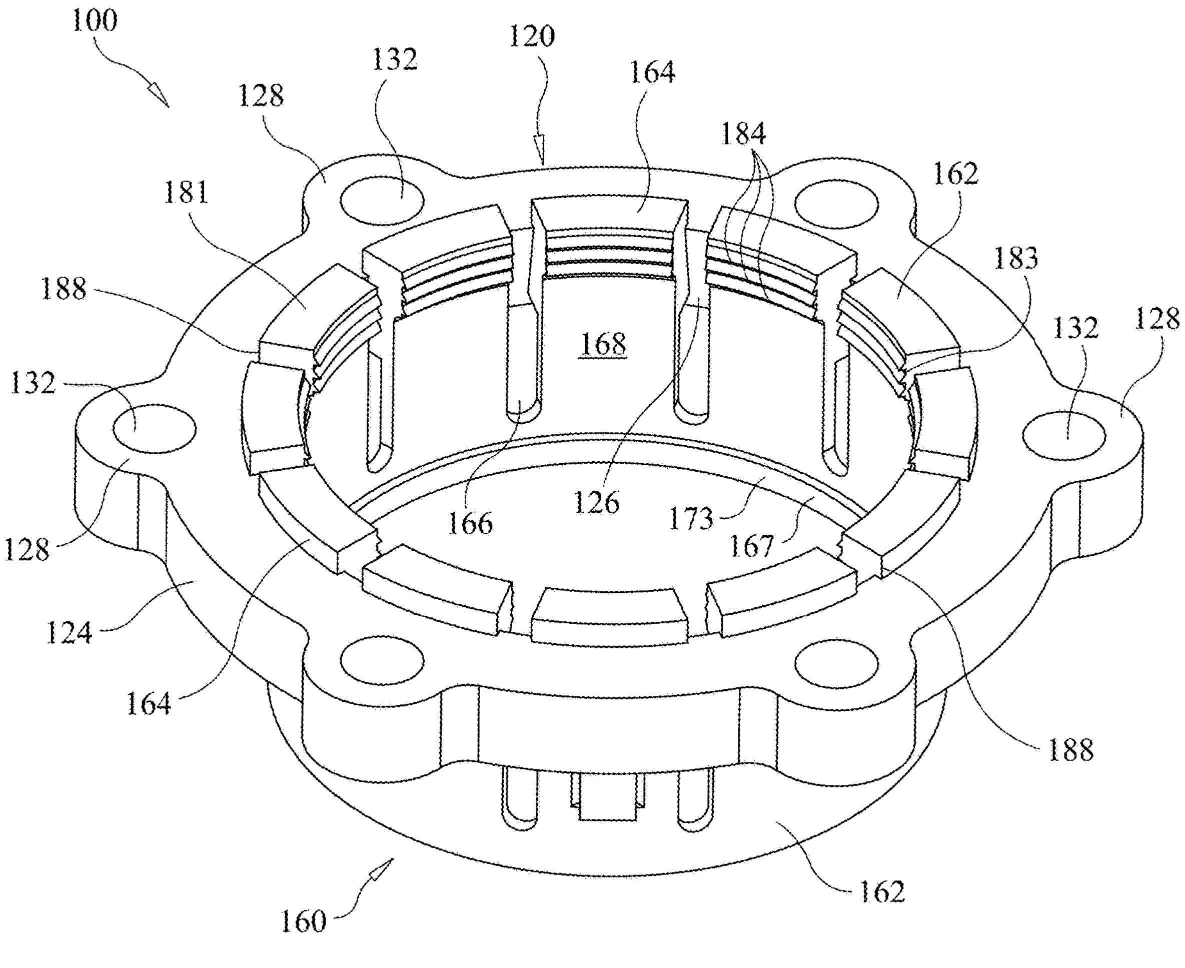
FIG. 8 is a top perspective view of the retainer gland of FIGS. 5-7.
Figure 9:
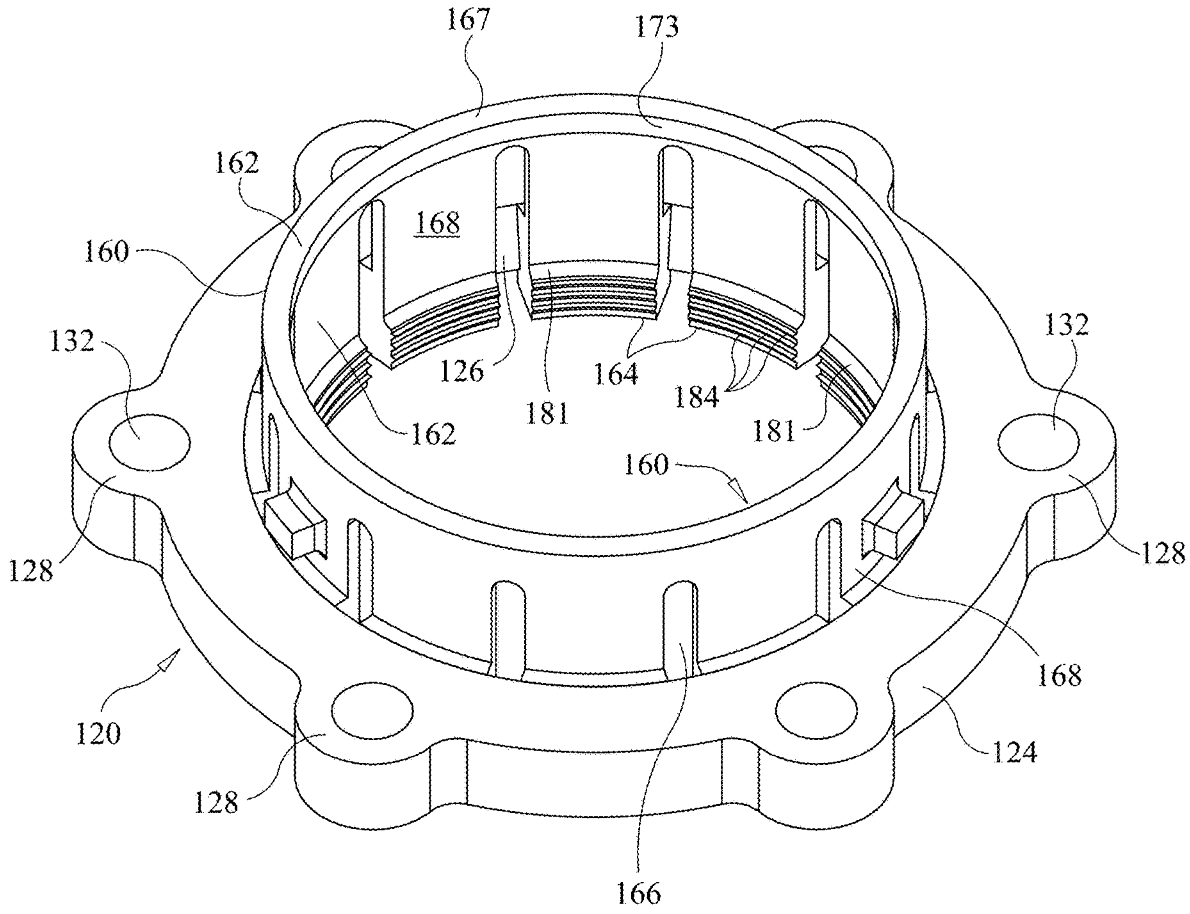
FIG. 9 is a bottom perspective view of the retainer gland of FIGS. 5-8.
Figure 10:
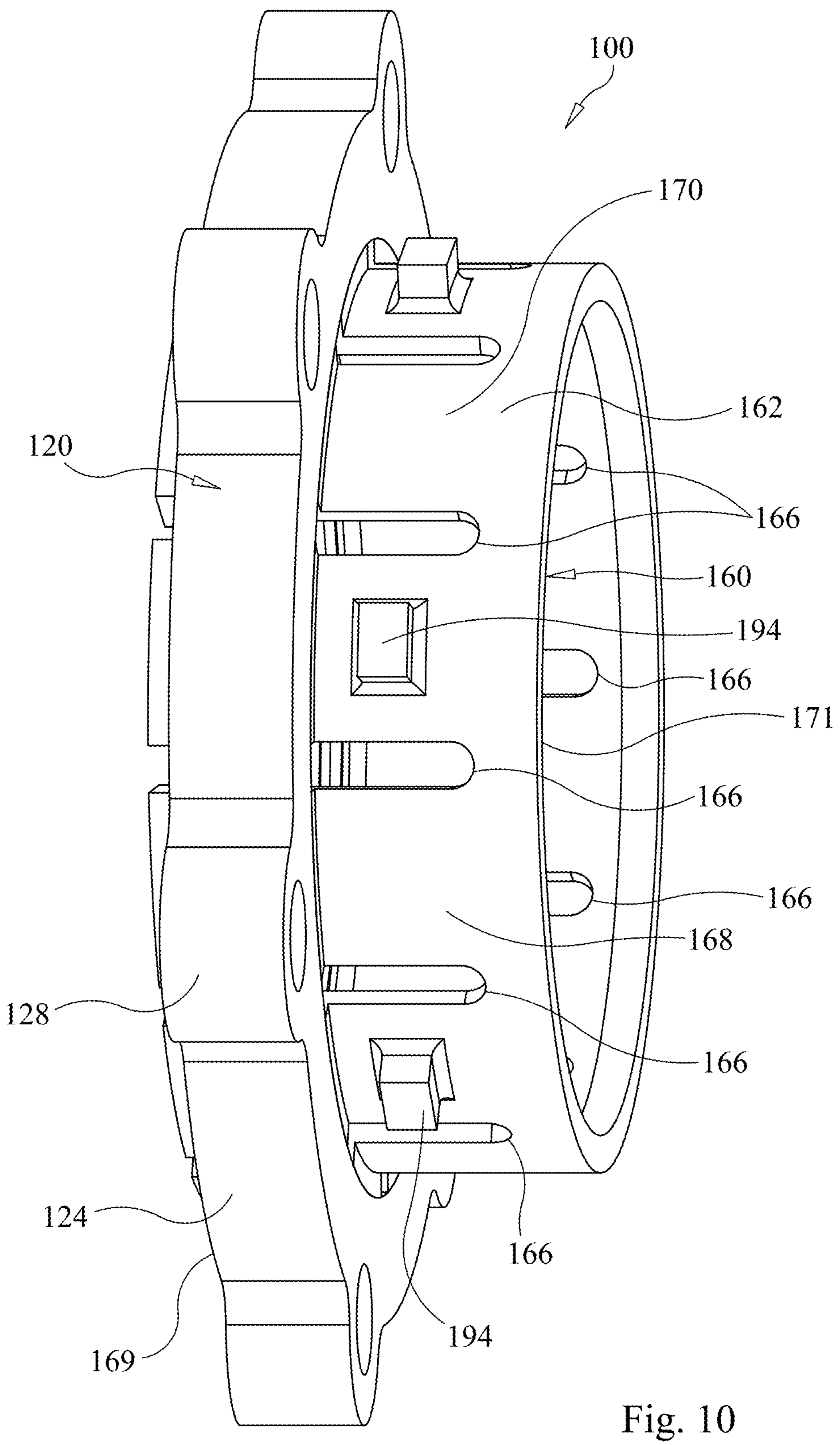
FIG. 10 is a side facing view of the retainer gland of FIGS. 5-9.
Figure 11:
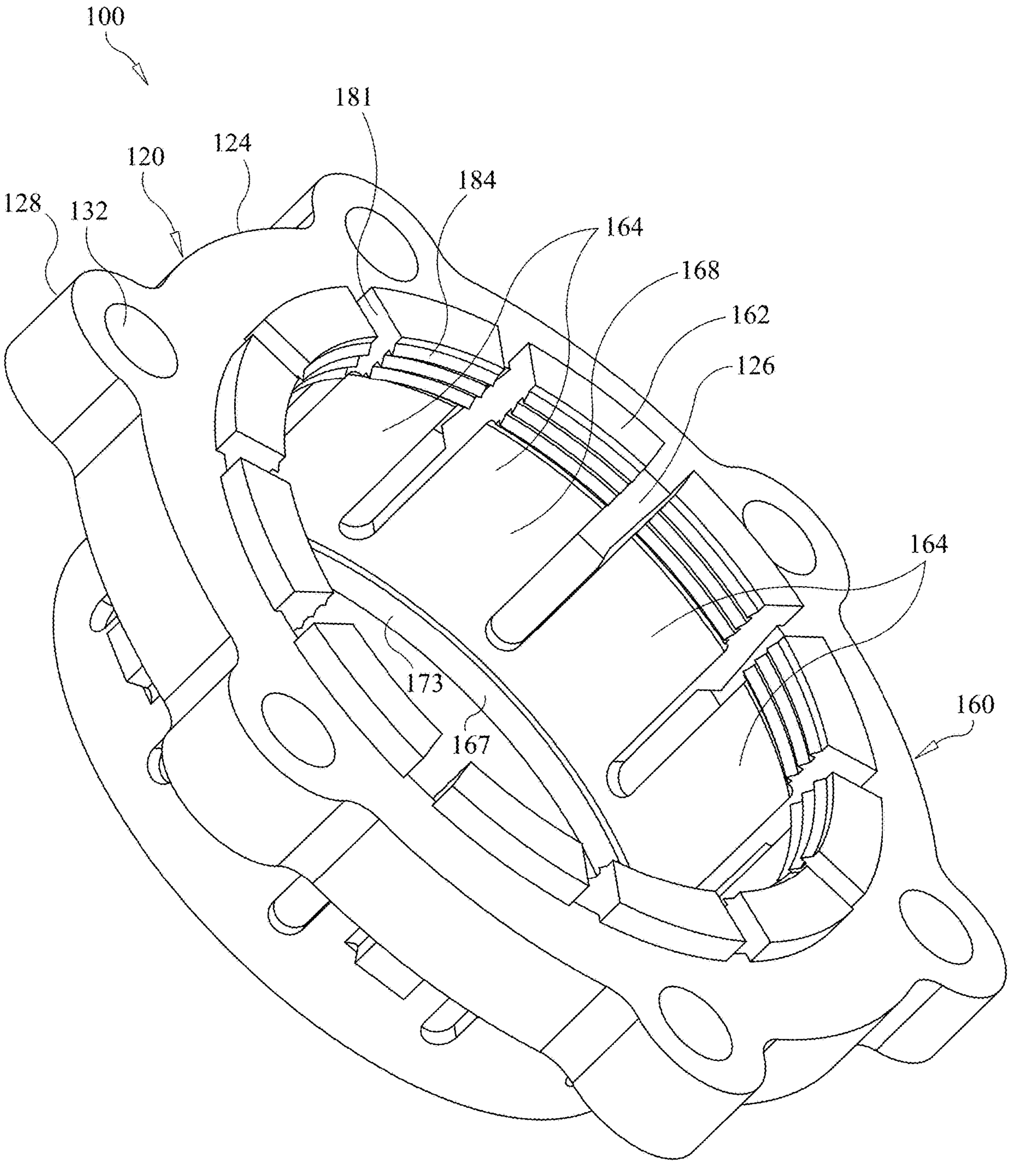
FIG. 11 is a top perspective view of the retainer gland of FIGS. 5-10.
Figure 12:
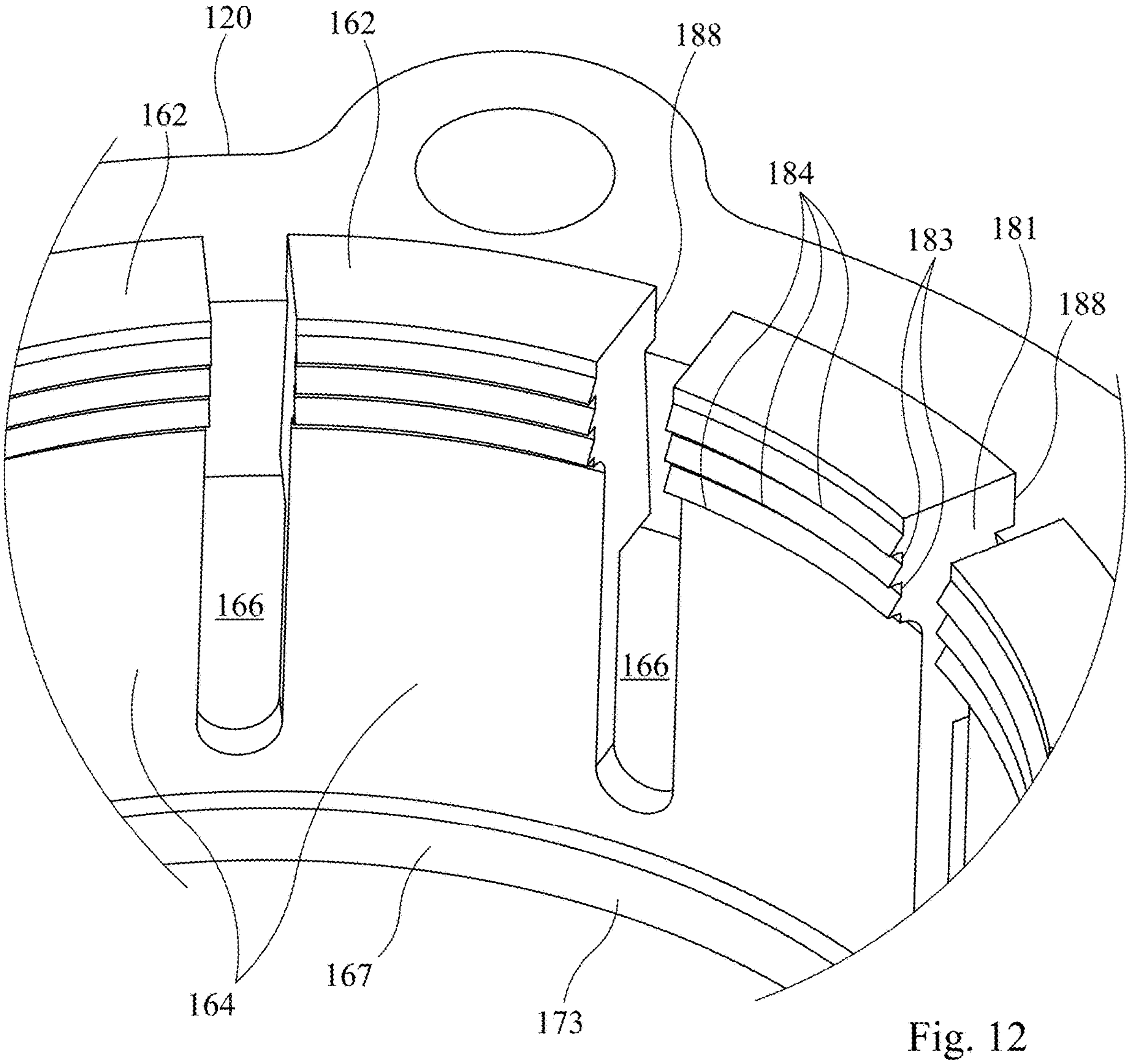
FIG. 12 is an enlarged view of a gripper ring engagement portion of the inner gripper ring of the retainer gland of FIGS. 5-11.

As shown in FIGS. 5-12 and most notably in FIG. 6, the outer securement ring 120 is defined by an outer periphery 124 and the inner periphery 126. The outer periphery 124 includes a plurality of fastener flanges 128 that project radially relative to a center axis of the securement ring 120. These fastener flanges 128 are circumferentially disposed and in equally spaced relation to one another. Each fastener flange 128 includes a single axially oriented mounting hole 132, with each mounting hole 132 passing entirely through a thickness of the respective fastener flange 128 to permit reception and/or passage of a T-bolt (see FIG. 2) or other form of fastener. In the exemplary retainer gland 100, a total of six fastener flanges 128 are formed at even 60 degree spacings about the center axis, though this number can be suitably varied. The inner periphery 126 of the outer securement ring 120 is defined by a beveled inner surface 136 that is configured for engagement with a portion of the inner gripper ring 160, as described further herein.

With continued reference to FIGS. 5 and 7-12, the inner gripper ring 160 is defined by a hollow substantially cylindrically shaped body 162 that includes semi-annular fingers 164 extending to a first end 169 from an annular, ring-shaped base 167 at an opposing second end 171. The base 167 has an annular inner surface 173 sized to be nominally larger than a pipe around which the inner gripper ring 160 is configured to be positioned.

The fingers 164 extend from the base 167, spaced circumferentially around the base 167. Slots 166 in the body 162 of the inner gripper ring 160 separate the fingers 164, with one slot between two adjacent fingers 164. The slots 166 extend axially from the first end 169 of the body 162 toward the opposing end 171 and pass entirely through the fingers 164 but not through the base 167. According to this exemplary embodiment, a total of 12 fingers 164 and 12 slots 166 are formed in the inner gripper ring 160, although this number can be varied suitably.

Each finger 164 has a wall 168 forming a segment of a circumference of the body 162. An inner diameter of the wall 168 is larger than an inner diameter of the annular inner surface 173, facilitating relief between the pipe and the fingers 164. The gripper fingers 164 combine to present a segmented ring for engaging the outer securement ring 120 and a pipe joint.

To engage the outer securement ring 120, each finger 164 includes a semi-annular, securement ring engagement portion 175, which projects radially outwardly from the wall 168. The securement ring engagement portion 175 includes an outer peripheral surface 177, which is sized and configured to engage the inner periphery 126 of the outer securement ring 120. More specifically, the outer peripheral surface 177 of each finger 164 is beveled for engagement with the beveled inner surface 136 provided on the inner periphery 126 of the outer securement ring 120 in a manner opposite to that of the beveled outer surfaces of a rubber gasket and inner retaining flange of a typical pipe joint. In some embodiments, a relatively low friction coating, such as graphite or polytetrafluoroethylene (PTFE), can be applied to the securement ring engagement portion 175 and in particular the outer peripheral surface 177. This coating can facilitate sliding between the outer peripheral surface 177 and the beveled inner surface 136, and can reduce particle (e.g., dirt) accumulation on the outer peripheral surface 177. Particles or material clinging to the outer peripheral surface 177 can increase friction, obstruct, or otherwise interfere with operation of the retainer gland 100. The beveled inner surface 136 can also be coated similarly.

Each finger 164 further includes a gripper tooth base 181 extending radially inward from or proximate from the first end 169 of the body 162. Each gripper tooth base 181 includes an innermost semi-annular surface 183 from which a gripper tooth 184 can extend. In this illustrated embodiment, a series of parallel, semi-annular, gripper teeth 184 are disposed on the gripper tooth base 181. The number of gripper teeth 184 per finger 164 can be varied as desired. Fewer gripper teeth 184 can apply more pressure per area of contact, which might be beneficial for use against harder pipe surfaces (e.g., ductile iron), and more gripper teeth 184 can apply less pressure per area of contact, which might be beneficial for use against softer pipe surfaces (e.g., PVC).

Each finger 164 further includes a radially outwardly projecting lip 188 at the first end 169 of the body 162. The lip 188 has an outer diameter greater than an inner diameter of the inner gripper ring 160 to retain in one axial direction the outer securement ring 120 around the inner gripper ring 160.

Figure 3:
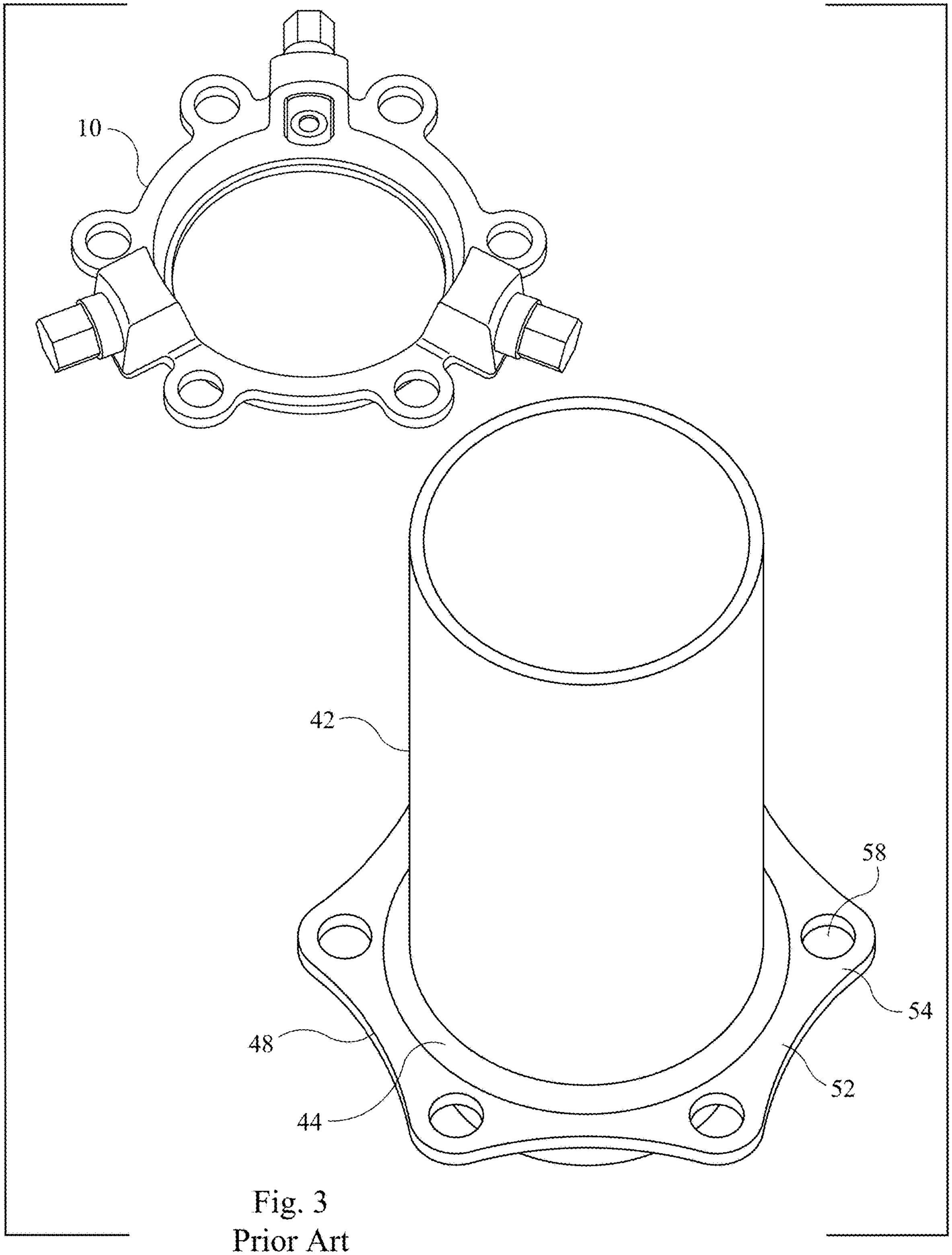
Fig. 3 Prior Art
FIG. 3 is a perspective view of the prior art prior art pipe joint assembly of FIG. 2, partially assembled.
Figure 4:
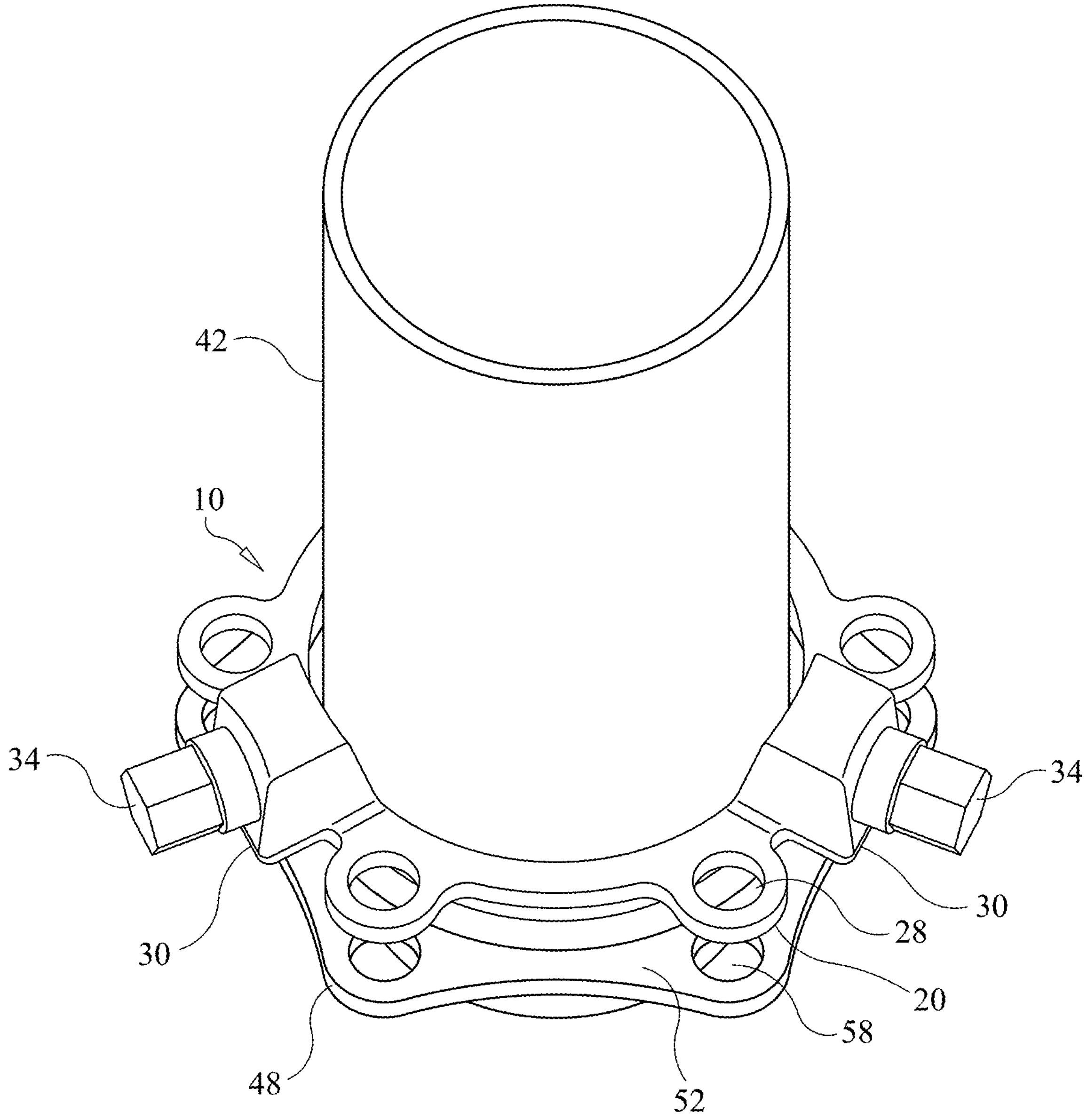
Fig. 4 Prior Art
FIG. 4 is a perspective view of the prior art pipe joint assembly of FIG. 2 using the known retainer gland of FIG. 2.
Figure 5:
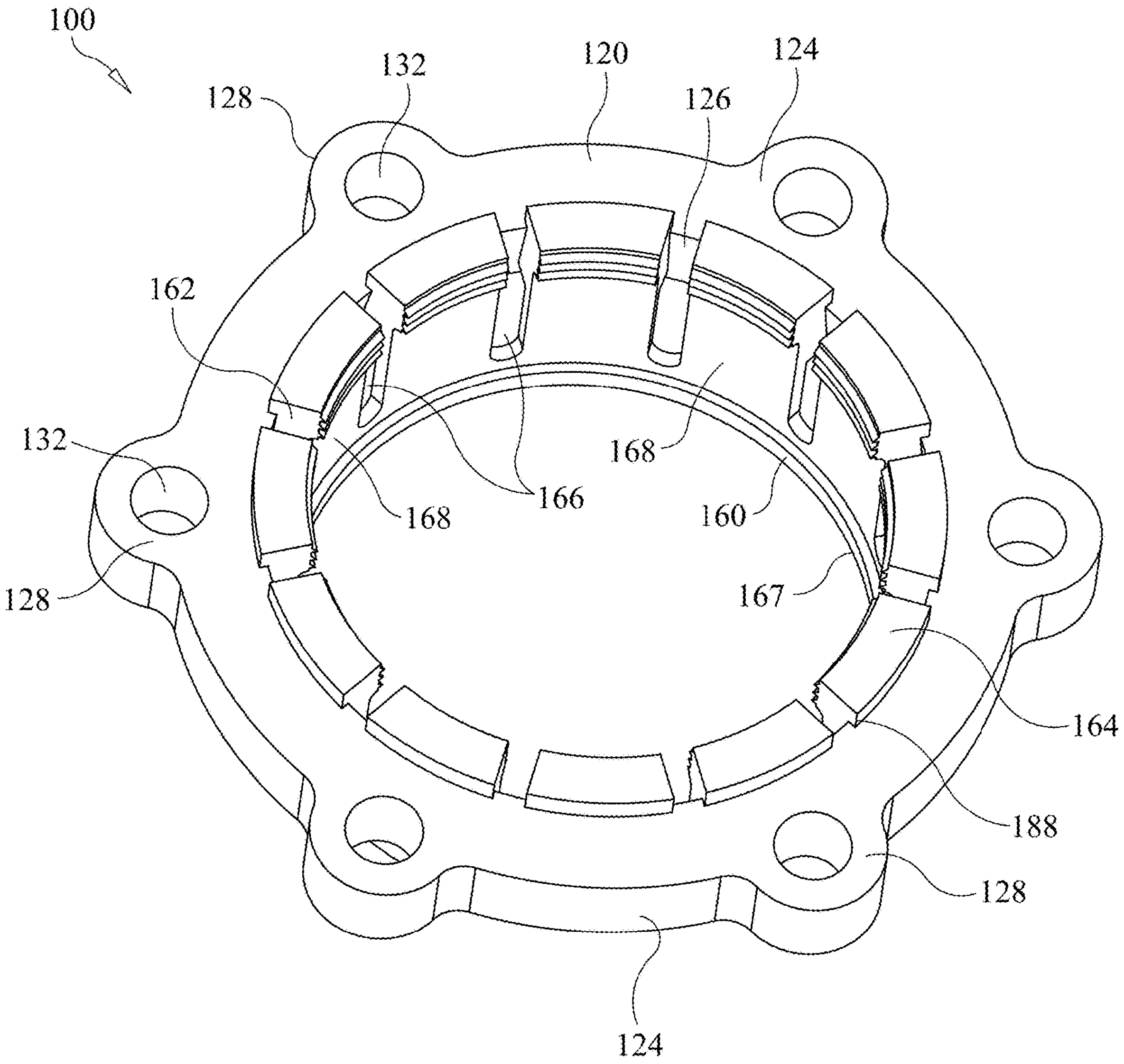
FIG. 5 is a top perspective view of a retainer gland, according to an embodiment of the invention.
Figure 13:
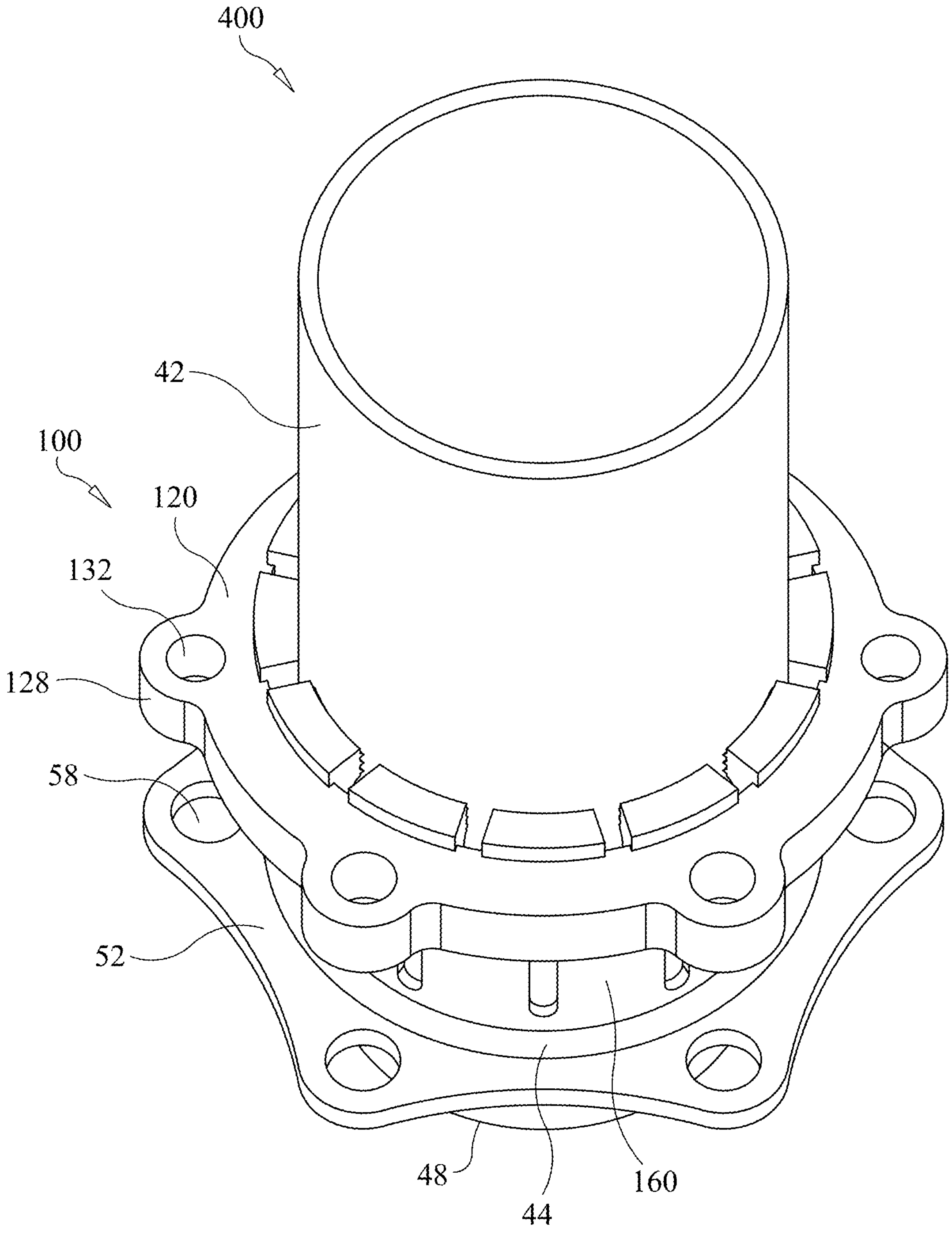
FIG. 13 is a perspective view of a pipe joint assembly using the retainer gland of 5.

FIG. 13 illustrates a pipe joint assembly 400 using the retainer gland 100. The pipe joint assembly 400 is like the pipe joint assembly 40 with the known retainer gland 10 replaced by the inventive retainer gland 100. The pipe 42 and rubber gasket 44 are fitted relative to the pipe socket 48, as discussed herein with respect to FIGS. 2 and 3. The retainer gland 100 is fitted over the extending pipe 42, the pipe 42 is extended into the pipe socket 48, and the retainer gland 100 is positioned with the base 167 of the inner gripper ring 160 of the retainer gland 100 against a top end surface of the rubber gasket 44. The fastener flanges 128 of the outer securement ring 120 are aligned with the fastener flanges 54 of the outer pipe flange 52 of the pipe socket 48. As opposed to the known retainer gland 10, securement is achieved by tightening only the T-bolts 60 (see FIG. 2) and nuts 62 (see FIG. 2) through the mounting holes 58, 132. With the base 167 of the inner gripper ring 160 of the retainer gland 100 abutting the rubber gasket 44, tightening of the T-bolts 60 and nuts 62 draws the outer securement ring 120 toward the pipe socket 48 and toward the base 167 of the inner gripper ring 160. As the outer securement ring 120 moves axially with respect to the inner gripper ring 160, the engagement of the beveled inner surface 136 of the outer securement ring with the beveled outer peripheral surface 177 of each finger 164 resists the axial movement of the outer securement ring 120, facilitating axial force of the inner gripper ring 160 and the base 167 against a top surface of the rubber gasket 44, and flexing the fingers 164 and pressing the gripper teeth 184 radially inward into and against the pipe 42. Compression on the rubber gasket 44 sufficient to seal the pipe joint is achieved before a bite of the gripper teeth 184 on or in the pipe 42 becomes strong enough to prevent further axial movement of the inner gripper ring 160. The axially forced engagement of the base 167 against the rubber gasket 44 presses the rubber gasket 44 against both the base 167, an upper surface of the pipe socket 48, and the pipe 42 to strengthen the seal of the pipe joint. The inner gripper ring 160 further includes one or more stops 194, each on an outer side of a respective one of the walls 168. The stops 194 prevent the outer securement ring 120 from axial movement relative to the inner gripper ring 160 beyond a desired amount in the event the T-bolts 60 and nuts 62 are excessively tightened. The stops 194 can be positioned such that the T-bolts 60 and nuts 62 can be tightened until the outer securement ring 120 is pressed against the stops 194, avoiding a need to tighten the T-bolts 60 and nuts 62 to a particular torque. In other words, the stops 194 can be positioned such that the appropriate torque tightening the T-bolts and nuts 62 is achieved when the outer securement ring 120 abuts the stops 194.

According to an embodiment, the gripper teeth 184 are heat treated to increase hardness, e.g. such that the hardness is at minimum greater than the surface of the pipe 42, to increase durability of the gripper teeth 184, increase the impact force the gripper teeth 184 can endure, and increase the bite of the gripper teeth 184 into the pipe 42. Increasing the hardness of the gripper teeth 184 is particularly useful for use with relatively hard pipe, such as ductile iron pipe. In some embodiments, just the tip of each gripper tooth 184 is heat treated. Alternatively to heat treatment, materials with relatively high hardness and compressive strength, such as white iron, can also be used to manufacture the inner gripper ring 160.

Figure 14:
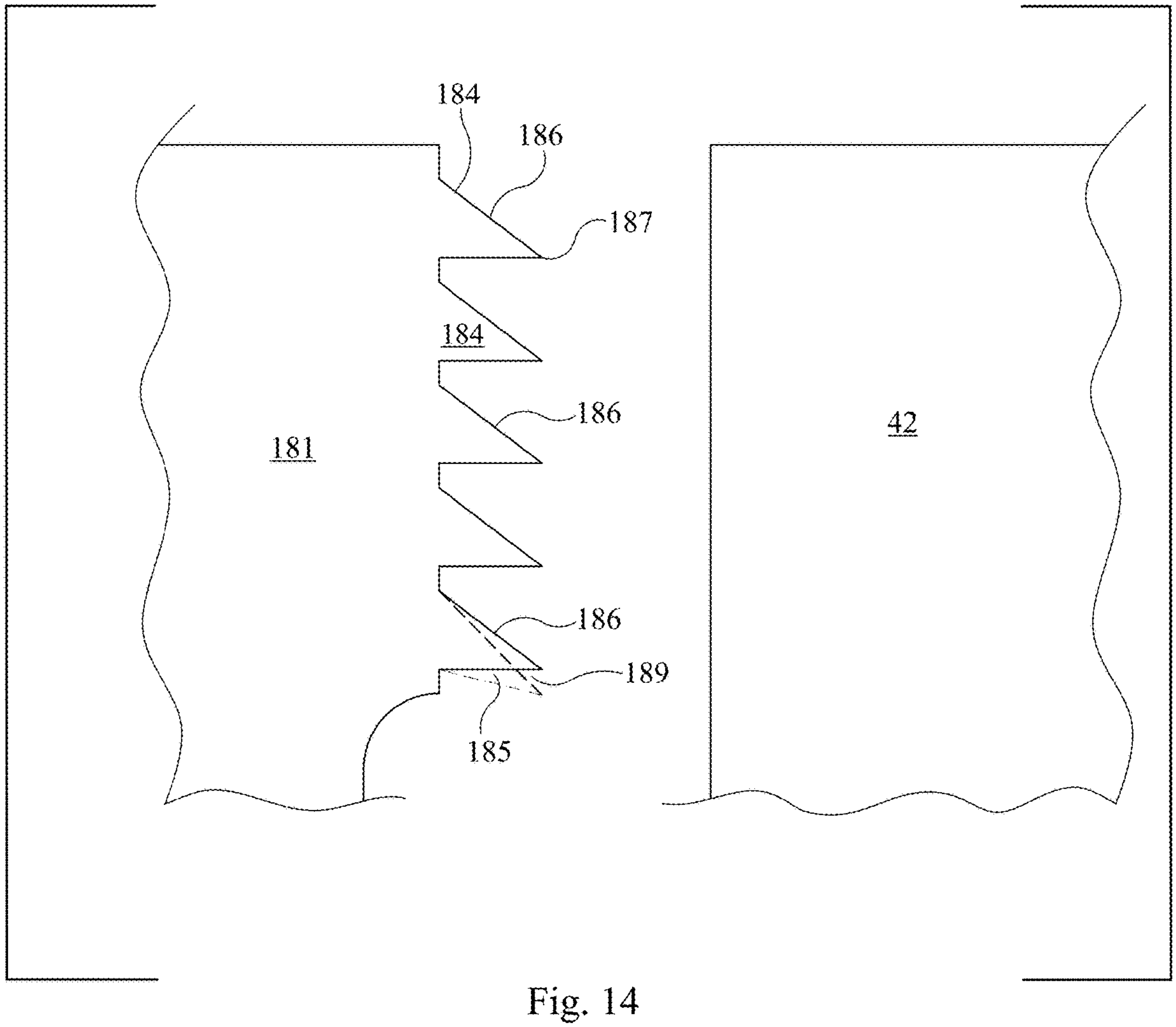
FIG. 14 is a profile view of the gripper teeth of FIG. 12.

Further, referring to FIG. 14, each gripper tooth 184 can have a flat surface 185 on one side that is substantially perpendicular to the major axis of the inner gripper ring 160 and an angled surface 186 on the opposing side of each gripper tooth 184—the flat surface 185 and the angled surface 186 intersecting to form a tip 187. This design creates a bite angle 189 that creates a “back-bite”, which enables each gripper tooth 184 to more strongly engage the pipe 42 to facilitate retention upon engagement (shown for a single gripper tooth 184, in phantom). The “back-bite” occurs when the fingers bend and bow during tightening of the T-bolts 60 and nuts 62 to install the retainer gland 100 on a pipe joint.

Figure 15:
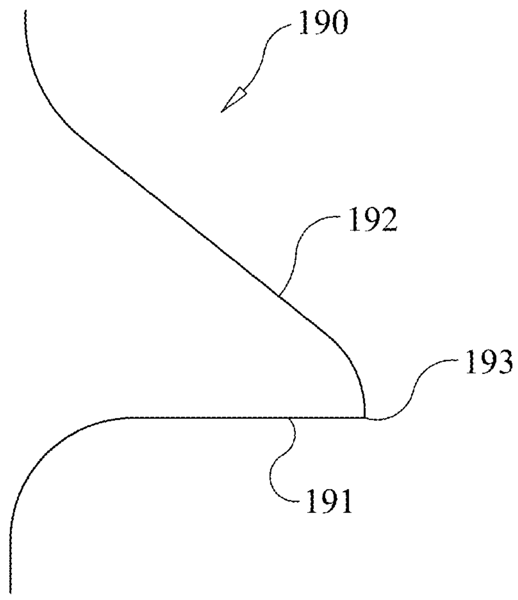
FIG. 15 is a profile view of a gripper tooth, according to an embodiment.

FIG. 15 is a profile view of an alternative gripper tooth 190. The gripper tooth 190 has a first surface 191 and a second surface 192, the first surface and the second surface intersecting to form a tip 193. The first surface 191 is flat and the second surface 192 is convex proximal to the tip 193. The convex portion adds structural support to the tip 193. Further, the convex portion facilitates casting of the gripper tooth 190 by adding material near the tip 193, which slows cooling of the tip 193 to facilitate filling a die with material before the material cools. In some embodiments, the first surface 191 faces in an axial direction toward the base. In some embodiments, the first surface 191 faces perpendicular to an axis of the inner gripper ring 160. In some embodiments, the first surface 191 faces up to five degrees from perpendicular to an axis of the inner gripper ring 160. Facing the surface at a relatively small angle from perpendicular can provide relief for a mold during casting.

Figure 16:
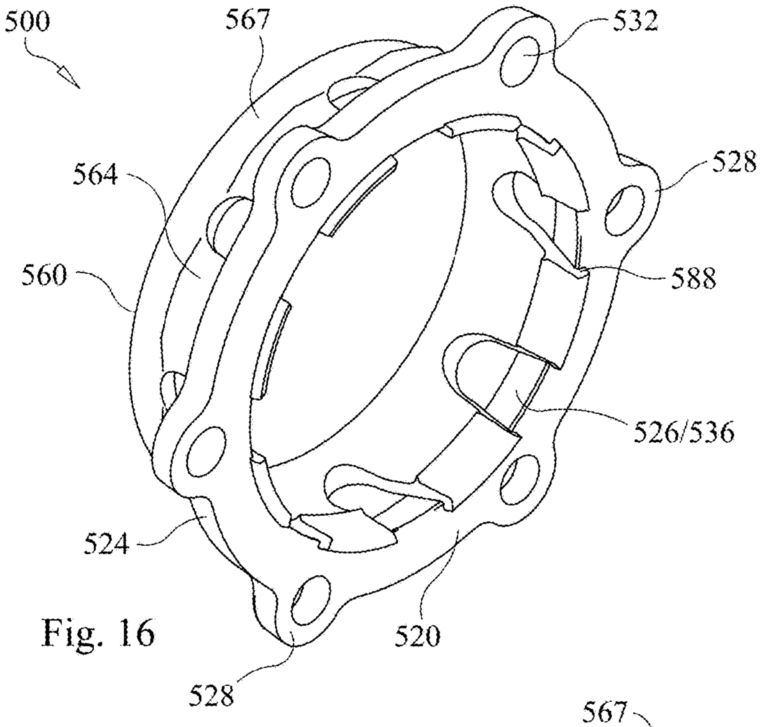
FIG. 16 is a perspective view of a retainer gland, according to an embodiment of the invention.
Figure 17:
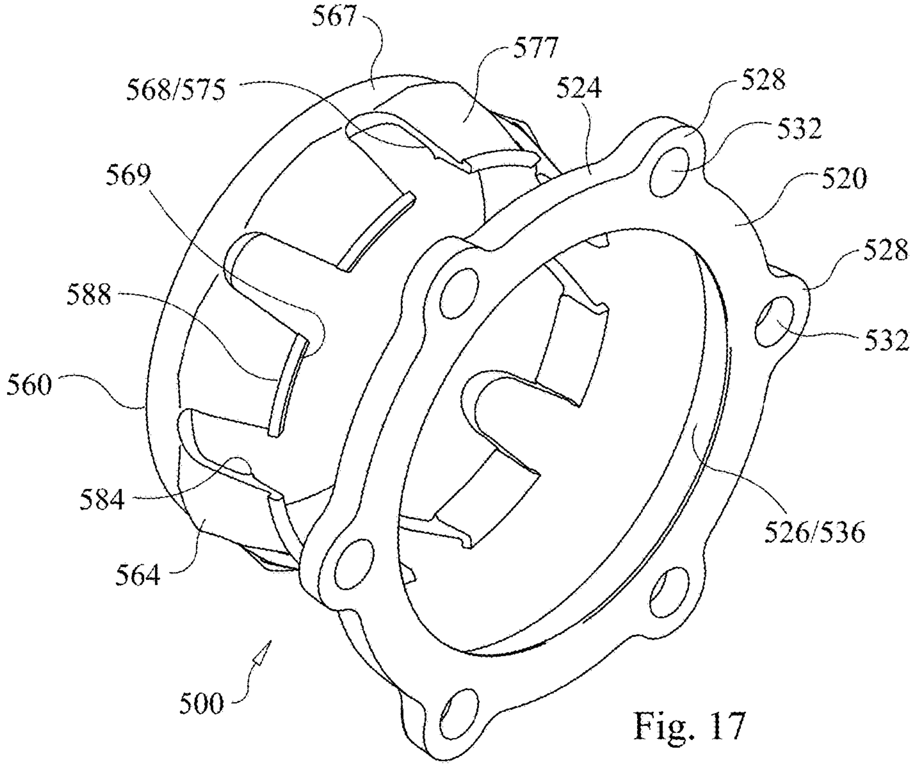
FIG. 17 is an exploded perspective view of the retainer gland of FIG. 16.
Figure 18:
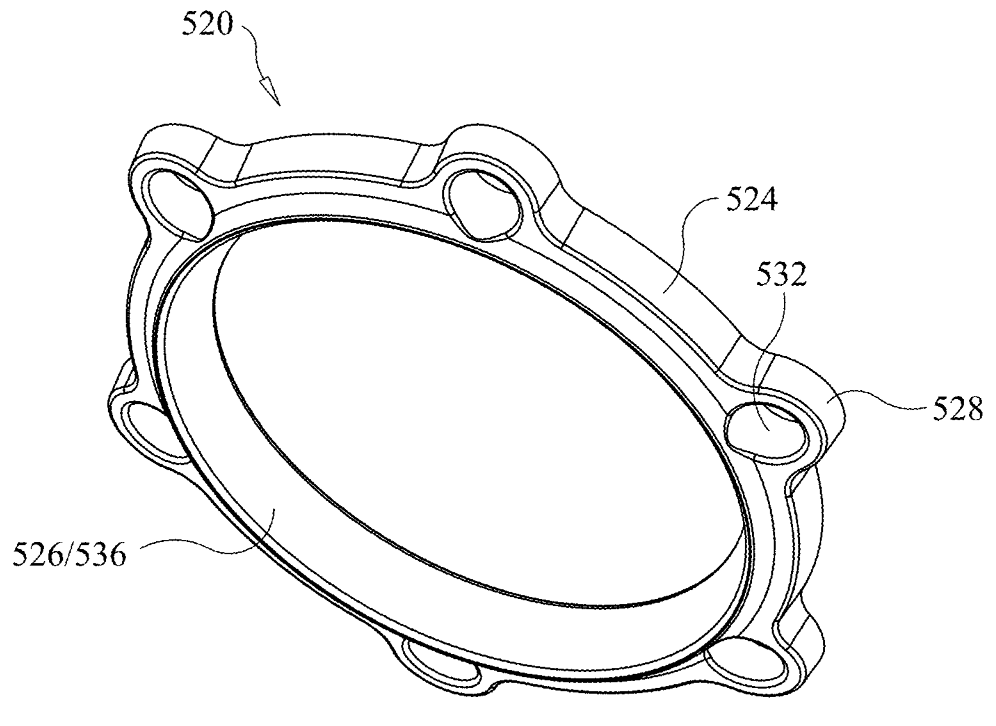
FIG. 18 is a perspective view of an outer securement ring of the retainer gland of FIG. 16.
Figure 19:
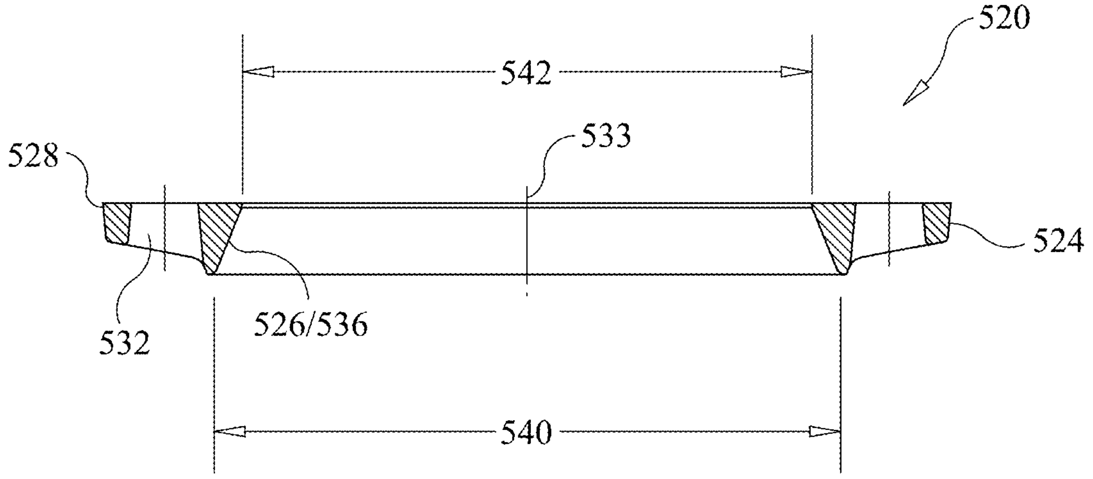
FIG. 19 is cross-sectional view of the outer securement ring of FIG. 18.
Figure 20:
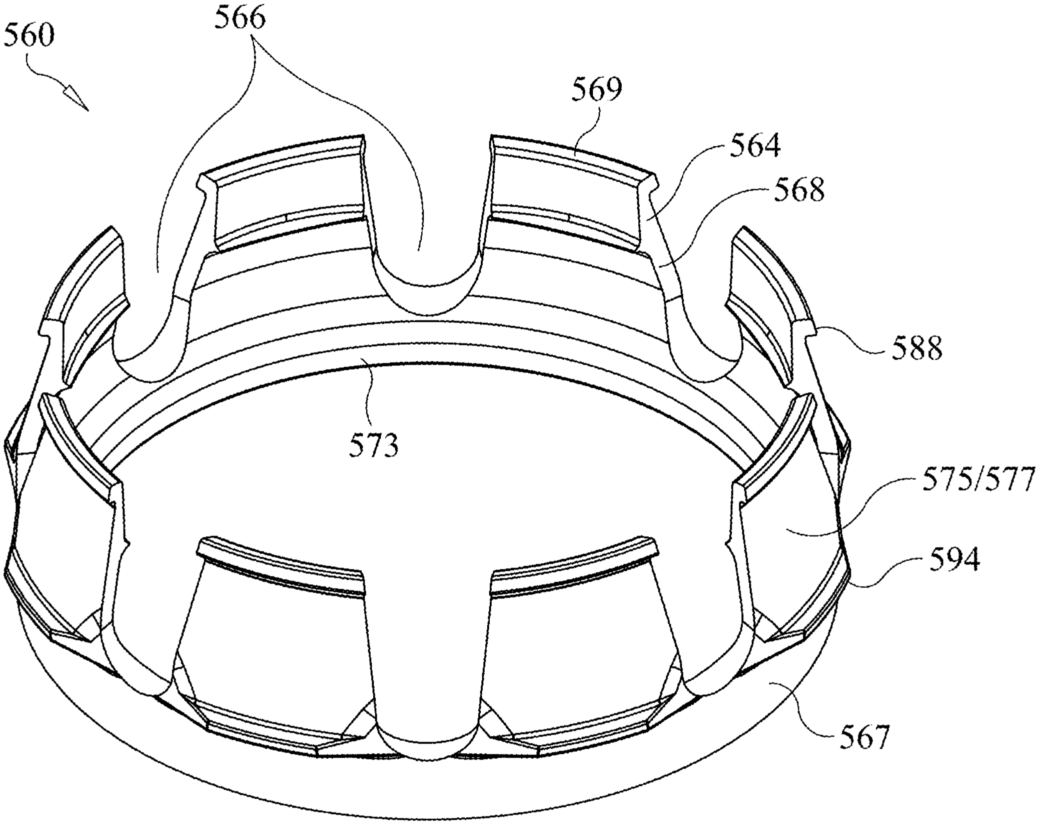
FIG. 20 is a perspective view of an inner gripper ring of the retainer gland of FIG. 16.
Figure 21:
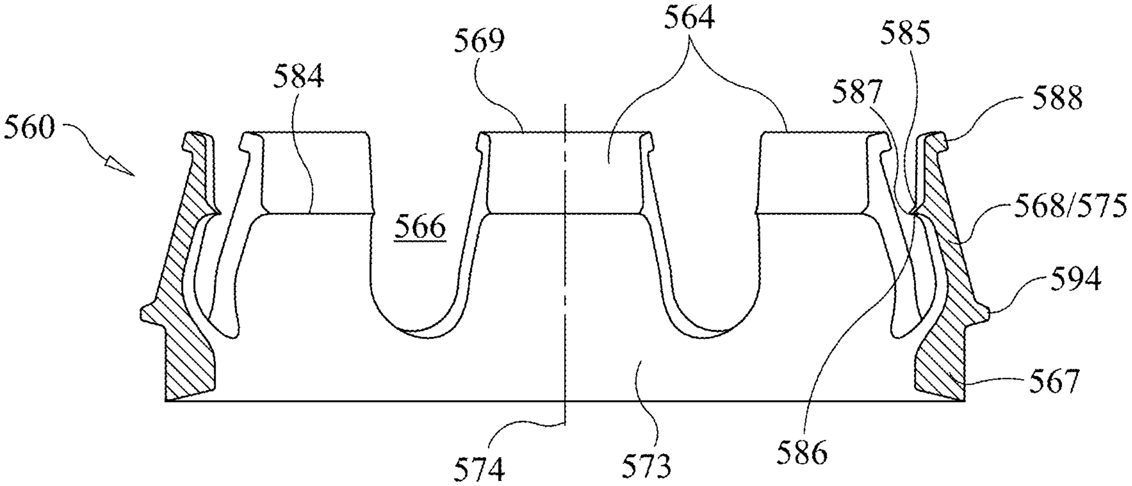
FIG. 21 is a cross-sectional view of the inner gripper ring of FIG. 20.

FIG. 16 is a perspective view of a retainer gland 500. FIG. 17 is an exploded perspective view of the retainer gland 500. FIG. 18 is a perspective view of an outer securement ring 520 of the retainer gland 500; FIG. 19 is cross-sectional view of the outer securement ring 520. FIG. 20 is a perspective view of an inner gripper ring 560 of the retainer gland 500. FIG. 21 is a cross-sectional view of the inner gripper ring 560.

Referring to FIGS. 16-17, the retainer gland 500 includes two major components, namely, an outer securement ring 520 and an inner gripper ring 560. The inner gripper ring 560 can be secured within an inner periphery 526 of the outer securement ring 520. The retainer gland 500 is entirely made from a ductile iron, although other suitable structural materials can be utilized. In addition, the retainer gland 500 can be formed in accordance with various manufacturing processes, including but not limited to sand casting, plaster mold casting, investment casting, lost-wax casting, lost-foam casting, fill-mold casting, evaporative pattern casting, shell casting, and precision machining.

Referring to FIGS. 16-19, the outer securement ring 520 has an outer periphery 524 with a plurality of fastener flanges 528 that project radially relative to a center axis of the outer securement ring 520. These fastener flanges 528 are circumferentially disposed and in equally spaced relation to one another. Each fastener flange 528 includes a single axially oriented mounting hole 532, with each mounting hole 532 passing entirely through a thickness of the respective fastener flange 528 to permit reception and/or passage of a T-bolt (see FIG. 2) or other form of fastener. In the exemplary retainer gland 500, a total of six fastener flanges 528 are formed at even 60 degree spacings about a center axis 533, though this number can be suitably varied. The inner periphery 526 of the outer securement ring 520 is defined by a beveled inner surface 536 that is configured for engagement with a portion of the inner gripper ring 560, as described further herein.

With reference to FIGS. 16-17 and 20-21, the inner gripper ring 560 includes semi-annular fingers 564 extending from an annular, ring-shaped base 567. The base 567 has an annular inner surface 573 sized to be nominally larger than a pipe around which the inner gripper ring 560 is configured to be positioned.

The fingers 564, extending from the base 567 to a finger end 569, are spaced circumferentially around the base 567. Slots 566 separate the fingers 564, with one slot 566 between two adjacent fingers 564. The slots 566 extend axially from the base 567 to the finger ends 569, passing entirely through the fingers 564 but not through the base 567. According to this exemplary embodiment, a total of 8 fingers 564 and 8 slots 566 are formed in the inner gripper ring 560, although this number can be varied suitably. Notably, the slots 566 and the fingers 564 are fewer in number than the slots 166 and fingers 164, and the slots 566 are larger in width than the slots 166. The extra spacing of the fingers 564 in this embodiment facilitates easier casing of the inner gripper ring 560 and fingers 564. Further, the width of the fingers 564 tapers from the base 567 toward the finger ends 569, providing more structural stability toward the base 567 where the fingers 564 are otherwise more prone to be subjected to deformation forces. The thickness of the fingers 564 can also be tapered along one or more axial lengths of the fingers 564 from the base 567 toward the fingers 564, for similar reasons.

Each finger 564 has a wall 568 forming a segment of a circumference of the inner gripper ring 560. An inner diameter of the wall 568 is larger than an inner diameter of the annular inner surface 573 of the base 567, facilitating relief between the pipe and the fingers 564. The fingers 564 combine to present a segmented ring for engaging the outer securement ring 520 and a pipe joint.

Referring to FIGS. 16-21, to engage the outer securement ring 520, the wall 568 of each finger 564 includes a semi-annular, securement ring engagement portion 575 between a radially outwardly projecting lip 588 at the finger end 569 and a stop 594 proximal the base 567. The securement ring engagement portion 575 includes an outer peripheral surface 577, which is sized and configured to engage the inner periphery 526 of the outer securement ring 520. More specifically, the walls 568 of the fingers 564 are generally angled radially inward from the stop 594 to the finger end 569, such that the outer peripheral surface 577 of each finger 564 is similarly angled radially inward from the stop 594 to the finger end 569. In other words, a span of each outer peripheral surface 577 from the stop 594 to the finger end 569 has an axial component and a radially inward component. This radially inwardly angled peripheral surface 577 is configured to engage the beveled inner surface 536 provided on the inner periphery 526 of the outer securement ring 520 in a manner opposite to that of the beveled outer surfaces of a rubber gasket and inner retaining flange of a typical pipe joint. In some embodiments, a relatively low friction coating, such as graphite or polytetrafluoroethylene (PTFE), can be applied to the securement ring engagement portion 575 and in particular the outer peripheral surface 577. This coating can facilitate sliding between the outer peripheral surface 577 and the beveled inner surface 536, and can reduce particle (e.g., dirt) accumulation on the outer peripheral surface 577. Particles or material clinging to the outer peripheral surface 577 can increase friction, obstruct, or otherwise interfere with operation of the retainer gland 500. The beveled inner surface 536 can also be coated similarly.

The radially outwardly projecting lips 188 project to a diameter smaller than an outermost diameter 540 of the beveled inner surface 536 of the outer securement ring 520, but greater than an innermost diameter 542 of the beveled inner surface 536 of the outer securement ring 520, such that the outermost diameter 540 of the beveled inner surface 536 of the outer securement ring 520 can be moved passed the lips 188 into position around the fingers 564 until the lips 188 abut the beveled inner surface 536 between the outermost diameter 540 of the beveled inner surface and the innermost diameter 542 of the beveled inner surface 536. Further axial movement of the outer securement ring 520 toward the stops 594 results in the beveled inner surface 536 pressing against the lips 188, elastically deforming the fingers 564 radially inwardly, until the innermost diameter 542 of the beveled inner surface 536 passes beyond the lips 188, and the lips 188 return radially outwardly to a greater outer diameter than the innermost diameter 542 of the beveled inner surface 536, locking the outer securement ring 520 on and around the inner gripper ring 560. In some embodiments, the fingers 564 return far enough radially outward such that the outer peripheral surfaces 577 immediately press against the beveled inner surface 536, holding the beveled inner surface 536 at the innermost diameter 542 against the lips 188 where the lips 188 meet the outer peripheral surfaces 577, until further axial force on the outer securement ring 520 is presented.

Further axial movement of the outer securement ring 520 toward the stops 594 results in the beveled inner surface 536 at the innermost diameter 542 contacting and pressing radially inwardly against the outer peripheral surfaces 577 of the fingers 564. The beveled inner surface 536 of the outer securement ring 520 is sloped more radially inward than the outer peripheral surfaces 577, such that the beveled inner surface 536 at its innermost diameter 542 is configured to contact the outer peripheral surfaces 577, with clearance otherwise between the beveled inner surface 536 and the outer peripheral surfaces 577, this clearance widening toward the outermost diameter 540 of the beveled inner surface 536. Accordingly, when tightening the outer securement ring 520 onto the inner gripper ring 560, the front end of travel (i.e., at the outermost diameter 540 of the beveled inner surface 536) does not dig into the outer peripheral surface 577 and the rear end of travel (i.e., at the innermost diameter 542 of the beveled inner surface 536) drags and/or reduces backward creep or loosening of the outer securement ring 520 on the inner gripper ring 560. Also, as the outer securement ring 520 travels axially toward the base 567 of the inner gripper ring 560, the fingers 564 might bow at the gripper tooth 584 or toward the base 567 from the gripper tooth 584, and the clearance accommodates this bowing. As the outer securement ring 520 travels axially toward the base 567 of the inner gripper ring 560 and the fingers 564 bend radially inward and/or portions of the fingers 564 bow radially outward, the angle or slope of the outer peripheral surfaces 577 approaches the angle or slope of the beveled inner surface 536.

Each finger 564 includes one or more gripper teeth 584 extending radially inwardly from the wall 568 at the securement ring engagement portion 575. Each gripper tooth 584 extends perpendicular to an axis 574 of the inner gripper ring 560, across a portion of a width of the respective finger 564 or to facilitate the most surface contact of each gripper tooth, across the entire width of the respective finger 564. Each gripper tooth 584 has a first surface 585 and a second surface 586, the first surface 585 intersecting the second surface 586 to form a tip 587, the first surface 585 and the second surface 586 angled such that the tip 587 is directed radially inward and axially toward the base 567. The inner gripper ring 560 shows a single gripper tooth 584 on each finger 564, though additional gripper teeth 584 can be positioned in parallel on each finger 564.

In some embodiments, when the outer securement ring 520 is fully tightened onto the inner gripper ring 560, the beveled inner surface 536 at the innermost diameter 542 is no closer to the stops 594 in an axial direction than the gripper teeth 584. In some embodiments, the innermost diameter 542 of the beveled inner surface 536 is about at the axial location of the gripper teeth 584. Here, the beveled inner surface 536 at its innermost diameter 542 presses into the back of the gripper teeth 584, reducing or minimizing risk of overstressing and/or breaking the fingers 564. Moving the innermost diameter 542 of the beveled inner surface 536 axially beyond the gripper teeth 584 toward the stops 594 increases the risk of overstressing and/or breaking the fingers 564.

Figure 22:
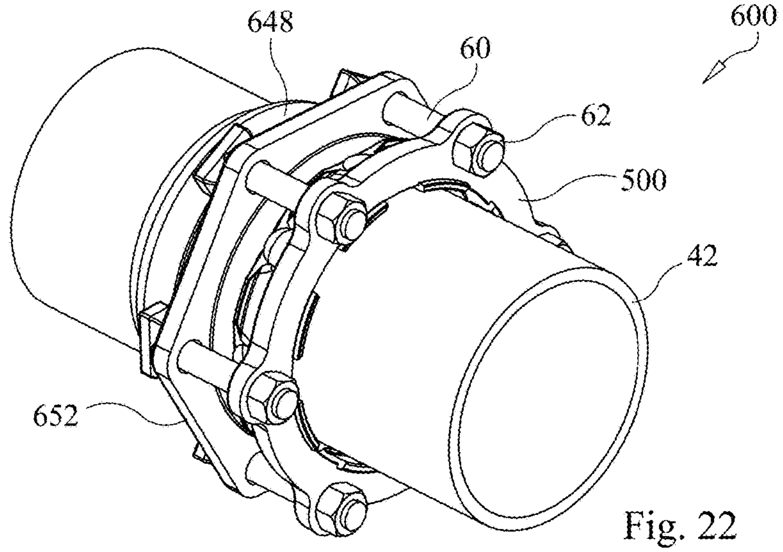
FIG. 22 is a perspective view of a pipe joint assembly using the retainer gland of FIG. 16.
Figure 23:
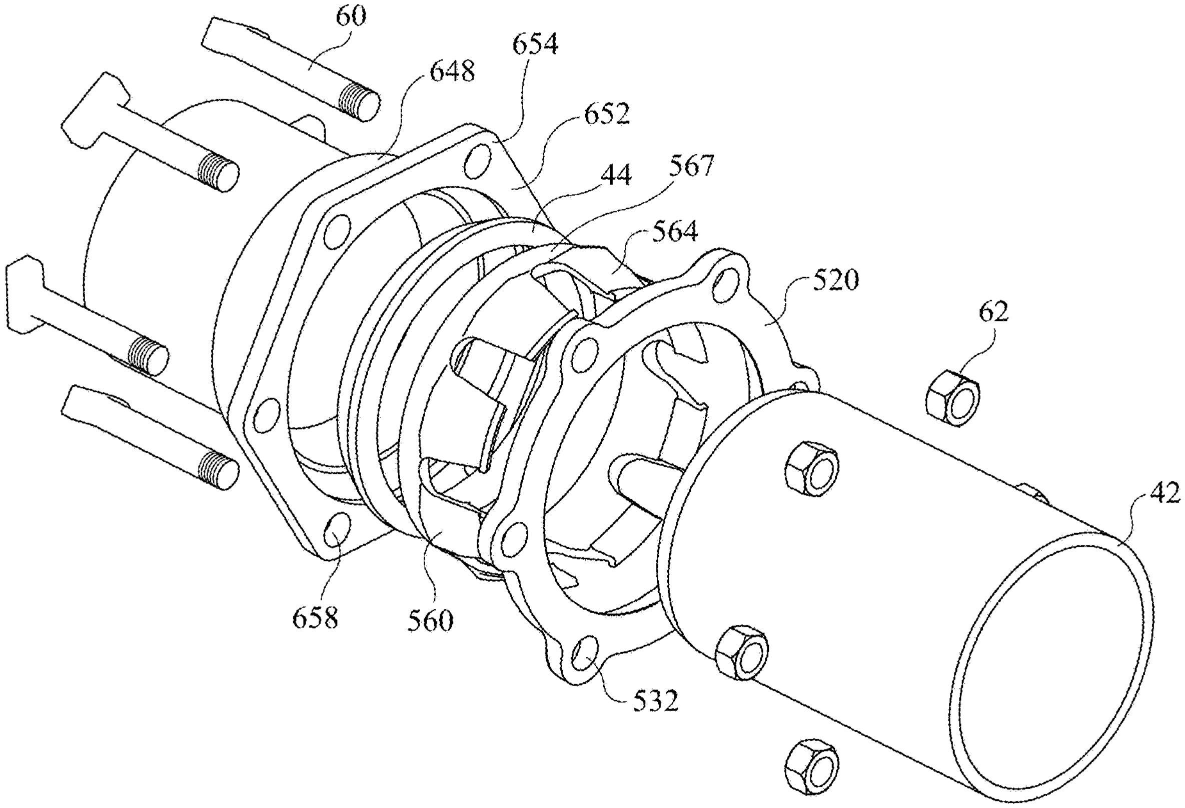
FIG. 23 is an exploded view of the pipe joint assembly of FIG. 22.
Figure 24:
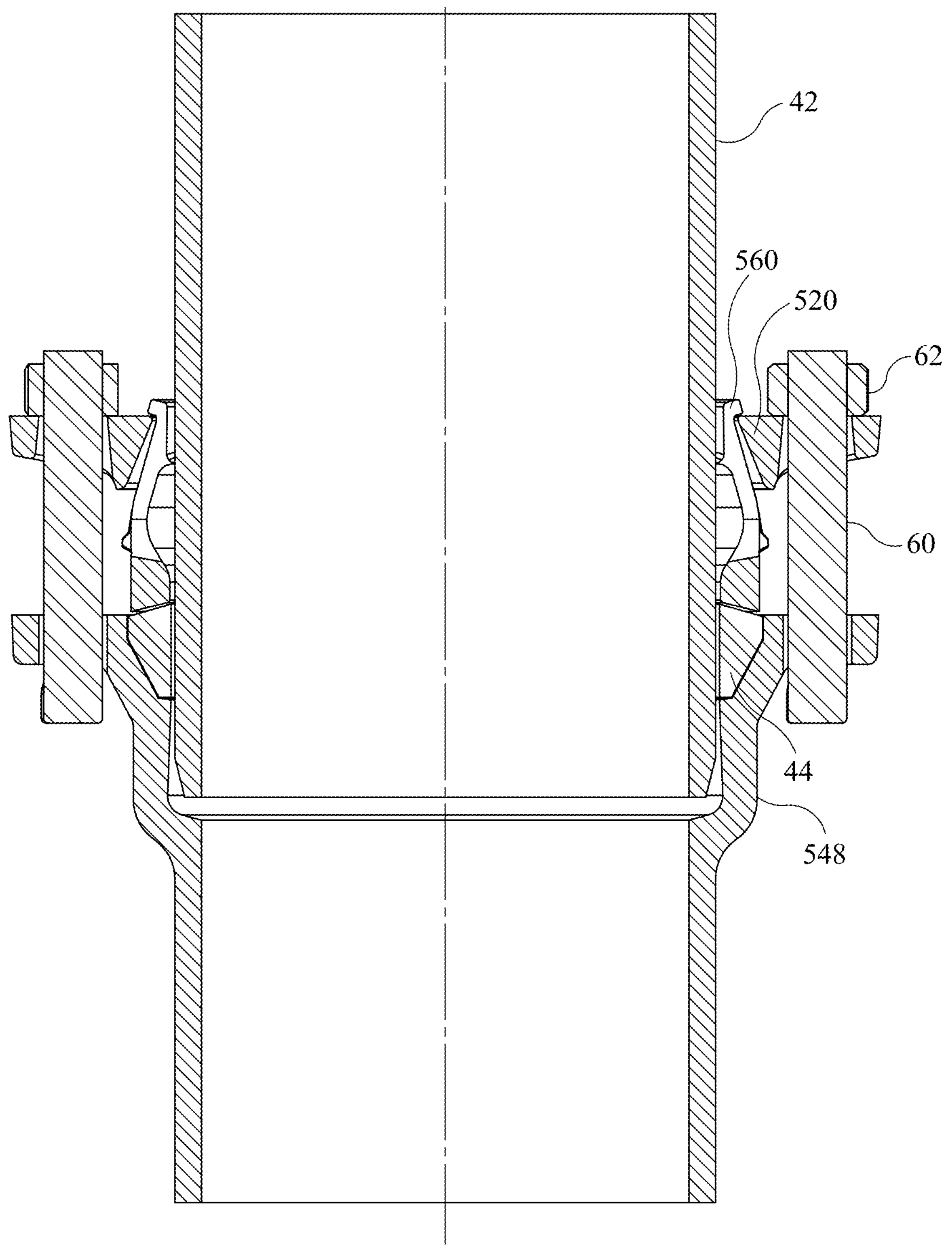
FIG. 24 is a cross-sectional view of the pipe joint assembly of FIG. 23.

FIG. 22 is a perspective view of a pipe joint assembly 600 using the retainer gland 500. FIG. 23 is an exploded view of the pipe joint assembly 600, and FIG. 24 is a cross-sectional view of the pipe joint assembly 600. Referring to FIGS. 22-24, the pipe joint assembly 600 is like the pipe joint assembly 40, 400, but using the retainer gland 500, and replacing the pipe socket 48 with a pipe socket 648, which is a socket on the end of a second pipe rather than an end cap. The first pipe 42 and rubber gasket 44 are fitted relative to the pipe socket 648, as discussed herein with respect to FIGS. 2 and 3. The retainer gland 500 is fitted over the extending first pipe 42, the first pipe 42 is extended into the pipe socket 648, and the retainer gland 500 is positioned with the base 567 of the inner gripper ring 560 of the retainer gland 500 against a top end surface of the rubber gasket 44. The fastener flanges 528 of the outer securement ring 520 are aligned with the fastener flanges 654 of the outer pipe flange 652 of the pipe socket 648. Securement is achieved by tightening only the T-bolts 60 and nuts 62 through the mounting holes 658, 532. With the base 567 of the inner gripper ring 560 of the retainer gland 500 abutting the rubber gasket 44, tightening of the T-bolts 60 and nuts 62 draws the outer securement ring 520 toward the pipe socket 648 and toward the base 567 of the inner gripper ring 560. As the outer securement ring 520 moves axially with respect to the inner gripper ring 560, the engagement of the beveled inner surface 536 of the outer securement ring 520 with the outer peripheral surface 577 of each finger 564 resists the axial movement of the outer securement ring 520, facilitating axial force of the inner gripper ring 560 and the base 567 against a top surface of the rubber gasket 44, and flexing the fingers 564 and pressing the gripper teeth 584 radially inward into and against the first pipe 42. The axially forced engagement of the base 567 against the rubber gasket 44 presses the rubber gasket 44 against the base 567, an upper surface of the pipe socket 48, and the first pipe 42 to strengthen the seal of the pipe joint. The stops 594 prevent the outer securement ring 520 from axial movement relative to the inner gripper ring 560 beyond a desired amount in the event the T-bolts 60 and nuts 62 are excessively tightened. The stops 594 can be positioned such that the T-bolts 60 and nuts 62 can be tightened until the outer securement ring 520 is pressed against the stops 594, avoiding a need to tighten the T-bolts 60 and nuts 62 to a particular torque. In other words, the stops 594 can be positioned such that the appropriate torque tightening the T-bolts and nuts 62 is achieved when the outer securement ring 520 abuts the stops 594.

As discussed, the retainer gland 100, 500, including the inner gripper ring 160, 560 and/or the outer securement ring 120, 520, can be made from ductile iron. A ductile iron with relatively high elongation, such as 60-40-18 ductile iron, can be advantageous, particularly for the relatively high deformability. With the outer securement ring 120, 520 pressing the gripper teeth 184, 584 radially inward, the pipe 42 pressing back against the gripper teeth 184, 584, and the fingers 164, 564 being connected to the base 167, 567, a higher deformability of the material lessens the risk of the gripper teeth 184, 584 breaking or snapping off. Further, any out-of-roundness or asymmetry in various aspects of the outer securement ring 120, 520 and/or the inner gripper ring 160, 560 can be compensated by deformation of respective mating surfaces in the other component. For example, if the T-bolts 60 and nuts 62 are tightened nonuniformly and/or inconsistently, the outer securement ring 120, 520 can potentially yield without breaking; or if the outer securement ring 120, 520 is out of round, tightening of the outer securement ring 120, 520 around the fingers 164, 564 can deform the outer securement ring 120, 560 to match the annular shape of the plurality of fingers 564. Accordingly, material with higher elongation can be manufactured with less strict tolerancing. Furthermore, in the casting process, material such as 60-40-18 ductile iron resists chilling, which results in less brittleness.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention that are within the spirit of the disclosure or equivalent to the inventions found in the claims, it is the intent that this patent will cover those variations as well.

To the extent that the claims recite the phrase “at least one of” in reference to a plurality of elements, this phrase is intended to mean at least one or more of the listed elements and is not limited to at least one of each element. For example, “at least one of an element A, element B, and element C,” is intended to indicate element A alone, or element B alone, or element C alone, or any combination thereof. “At least one of element A, element B, and element C” is not intended to be limited to at least one of an element A, at least one of an element B, and at least one of an element C.

This detailed description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated and in accordance with the following appended claims. Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above.

Accordingly, it is to be understood that the embodiments of the invention herein described are merely illustrative of the application of the principles of the invention. Other variations and modifications will be apparent to a person reading the description and as set forth in the following claims. Reference herein to details of the illustrated embodiments is not intended to limit the scope of the claims, which themselves recite those features regarded as essential to the invention.

What is claimed is:

1. A retainer gland for securing a pipe joint, the retainer gland comprising:

an outer securement ring having a periphery and a plurality of fastener flanges in spaced relation about the periphery, each of the fastener flanges having a mounting hole therethrough; and an inner gripper ring configured to be disposed within the outer securement ring, the inner gripper ring having a base and a plurality of gripper fingers disposed circumferentially about the base and extending from the base, the outer securement ring being between the base and an end of each finger distal from the base and extending axially no further than the base from the end of each finger distal from the base.

2. The retainer gland of claim 1, wherein each gripper finger includes a gripper tooth for engaging a pipe.

3. The retainer gland of claim 2, wherein each gripper finger includes a wall and a gripper tooth base extending radially inward from the wall, each gripper tooth extending radially inward from the respective gripper tooth base.

4. The retainer gland of claim 2, wherein each gripper tooth has a first surface and a second surface, the first surface intersecting the second surface to form a tip, the first surface and the second surface angled such that the tip is directed radially inward and axially toward the base.

5. The retainer gland of claim 2, wherein each gripper tooth extends perpendicular to an axis of the inner gripper ring, across at least a portion of a width of the respective gripper finger.

6. The retainer gland of claim 5, wherein each gripper finger includes a plurality of the gripper tooth, each gripper tooth of the plurality on a respective gripper finger extending approximately in parallel.

7. The retainer gland of claim 1, wherein each gripper finger includes a lip projecting radially outward at an end of the respective gripper finger distal from the base.

8. The retainer gland of claim 1, wherein each gripper finger includes a wall angled radially inward from the base toward an end of the finger distal from the base.

9. The retainer gland of claim 1, wherein each gripper finger has a wall and a securement ring engagement portion that projects radially outward from the wall.

10. The retainer gland of claim 1, wherein the outer securement ring includes a beveled inner surface.

11. The retainer gland of claim 1, wherein each gripper finger has a securement ring engagement surface facing radially outward.

12. The retainer gland of claim 1, wherein each gripper tooth has a first surface and a second surface, the first surface and the second surface intersecting to form a tip, the tip being heat treated.

13. The retainer gland of claim 1, further comprising a gasket adjacent the base of the inner gripper ring and spaced from the outer securement ring.

14. The retainer gland of claim 1 including only one of the outer securement ring and only one of the inner gripper ring.

* * * * *